US008185134B2

(12) United States Patent
Gum et al.

(10) Patent No.: US 8,185,134 B2
(45) Date of Patent: May 22, 2012

(54) MULTIMODE GPS-ENABLED CAMERA

(75) Inventors: Arnold Jason Gum, San Diego, CA (US); Ajay Vasanadu, San Diego, CA (US); Charles Seunghwan Han, San Diego, CA (US); Marc Ische, San Diego, CA (US); John Alfred Tan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 846 days.

(21) Appl. No.: 12/255,583

(22) Filed: Oct. 21, 2008

(65) Prior Publication Data

US 2010/0097494 A1 Apr. 22, 2010

(51) Int. Cl.
*H04W 24/00* (2009.01)
(52) U.S. Cl. ............... 455/456.3; 455/456.1; 455/456.2; 455/457; 455/550.1; 455/456.6; 348/231.3; 348/231.99; 348/158
(58) Field of Classification Search ....... 455/456.1–457; 348/231.5, 231.99, 135, 234, 143, 148, 149, 348/231.3
See application file for complete search history.

(56) References Cited

U.S. PATENT DOCUMENTS

| | | | | |
|---|---|---|---|---|
| 6,525,768 | B2 * | 2/2003 | Obradovich | 348/231.99 |
| 7,636,733 | B1 * | 12/2009 | Rothmuller | 382/305 |
| 7,707,239 | B2 * | 4/2010 | Anderson et al. | 709/202 |
| 7,840,344 | B2 * | 11/2010 | Sloo | 701/454 |
| 7,995,117 | B1 * | 8/2011 | Bonn | 348/231.3 |
| 2004/0224700 | A1 * | 11/2004 | Sawano | 455/456.1 |
| 2006/0044401 | A1 * | 3/2006 | Park | 348/207.99 |
| 2006/0142027 | A1 * | 6/2006 | Krishnamurthi et al. | 455/457 |
| 2006/0208943 | A1 * | 9/2006 | Gronemeyer | 342/357.12 |
| 2007/0115373 | A1 * | 5/2007 | Gallagher et al. | 348/231.3 |
| 2008/0064438 | A1 * | 3/2008 | Calvet et al. | 455/556.1 |
| 2008/0104211 | A1 * | 5/2008 | Blumenfeld | 709/221 |
| 2008/0182587 | A1 * | 7/2008 | Bennett | 455/456.2 |
| 2009/0112452 | A1 * | 4/2009 | Buck et al. | 701/117 |
| 2010/0250136 | A1 * | 9/2010 | Chen | 701/300 |

FOREIGN PATENT DOCUMENTS

WO WO0175473 A2 10/2001
WO WO2005001714 A1 1/2005

OTHER PUBLICATIONS

International Search Report and Written Opinion—PCT/US2009/061272, International Search Authority—European Patent Office—Jan. 28, 2010 (051089WO).
Kentaro Toyama et al: "Geographical location Tags on Digital Images" Proceedings of the 11th. ACM International Conference on Multimedia. MM"03. Berkeley, CA, Nov. 4-6, 2003; [ACM International Multimedia Conference], New York, NY : A A ACM, US, vo 1. Conf. 11, Nov. 2, 2003, pp. 1-12, XP002420408 ISBN: 978-1-58113-722-4 table 2 p. 6, col. 1, line 18—p. 6, col.

* cited by examiner

*Primary Examiner* — Nick Corsaro
*Assistant Examiner* — Babar Sarwar
(74) *Attorney, Agent, or Firm* — Xue Ming Jimmy Cheng; Arnold J. Gum

(57) ABSTRACT

A method and device of geographically tagging images by capturing an image, determining a position based on detection of satellite signals and a wireless network signal, and tagging the image with the determined position is provided.

27 Claims, 20 Drawing Sheets

Fix = f(GPS,Network)

| Network coverage \ GPS coverage | No coverage | Poor coverage | Good coverage (option 1) | Good coverage (option 2) |
|---|---|---|---|---|
| Coverage | Network information | Assisted GPS | Stand-alone GPS | Assisted GPS |
| OOS | No fix available | No fix available | Stand-alone GPS | Stand-alone GPS |

Configure Fix

When?

☒ Fix after image

☐ Fix before image

How often?

☒ Every image

☐ First image only

FIGURE 5A

Batch Mode

Which fix?

☒ Use last fix

☐ Get new fix

Select image(s)

*(listing of images)*

FIGURE 5B

MULTIMODE GPS-ENABLED CAMERA

CROSS-REFERENCE TO RELATED APPLICATIONS

Not applicable.

BACKGROUND OF THE INVENTION

1. Field of the Invention

The invention relates generally to position location and more specifically to tagging images with a location fix in a GPS-enabled mobile station recording device.

2. Background of the Invention

With the continuing growing popularity of mapping systems that position locate photographs, consumers will want more products that automatically tie a reliable, robust, quick and accurate position location together with the functions of a camera. Known GPS-enabled cameras determine a location fix after each photograph is captured. These devices operate independently. That is, a camera provides a date-time stamp and a GPS device uses Standalone GPS to log location along with the date and time. Subsequent processing then batch processes the two sets of data on a PC to combine a picture with a location based on a common time stamp. Delays in determining a location fix using a GPS-enabled camera may be substantial. Furthermore, GPS-enabled cameras are not configurable by a user to best meet the needs of that user and do not use data obtained from wireless networks to assist in position location. GPS-enabled mobile stations, which use a wireless network to make voice and data calls, are also becoming more common. Such GPS-enabled mobile stations are being deployed to meet the FCC's 911 mandate and to provide enhanced functionality for mobile applications and user interaction. Such cameras and mobile stations fail to integrate and utilize the combined features of a GPS network of satellites and a wireless network when capturing images. Therefore, a need exists to have a more flexible and robust position location system to use when capturing images without one or more of these drawbacks.

SUMMARY

Some embodiments of the present invention provide for a method of geographically tagging images in a device comprising a camera, the method comprising: capturing an image; determining a position based on an attempt to detect satellite signals and wireless network signal; and tagging the image with the determined position.

Some embodiments of the present invention provide for a method of geographically stamping images in a device comprising a camera, the method comprising: determining a position based on an attempt to detect satellite signals and wireless network signal; capturing an image after the act of determining the position; and tagging the image with the determined position.

Some embodiments of the present invention provide for a method of geographically stamping a batch of images in a device comprising a camera, the method comprising: capturing a plurality of images; selecting the plurality of images; determining a position based on detection of satellite signals and detection of a wireless network signal; and tagging the plurality of images with the determined position.

Some embodiments of the present invention provide for a device comprising a camera for geographically tagging images, the device comprising: means for capturing an image; means for determining a position based on an attempt to detect satellite signals and wireless network signal; and means for tagging the image with the determined position.

Some embodiments of the present invention provide for a device comprising a camera for geographically stamping a batch of images, the device comprising: means for capturing a plurality of images; means for selecting the plurality of images; means for determining a position based on an attempt to detect satellite signals and wireless network signal; and means for tagging the plurality of images with the determined position.

Some embodiments of the present invention provide for a computer-readable product comprising a computer-readable medium comprising: code for causing at least one computer to capture an image; code for causing at least one computer to determine a position based on an attempt to detect satellite signals and wireless network signal; and code for causing at least one computer to tag the image with the determined position.

Some embodiments of the present invention provide for a computer-readable product comprising a computer-readable medium comprising: code for causing at least one computer to capture a plurality of images; code for causing at least one computer to select the plurality of images; code for causing at least one computer to determine a position based on an attempt to detect satellite signals and wireless network signal; and code for causing at least one computer to tag the plurality of images with the determined position.

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

FIGS. 5A and 5B illustrate screenshots, in accordance with some embodiments of the present invention.

DETAILED DESCRIPTION OF THE INVENTION

Figure 1A:
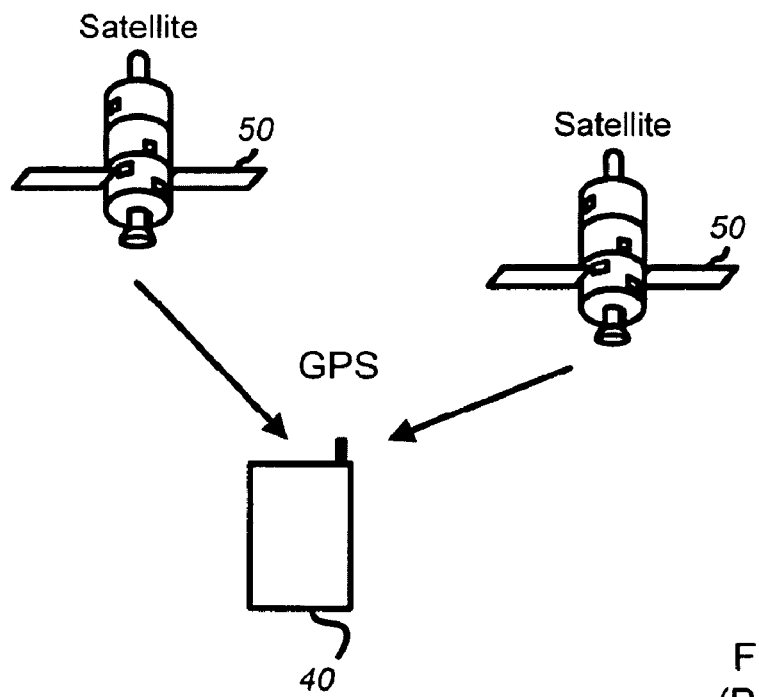
FIG. 1A shows satellite vehicles providing signals to a mobile station.

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description that follows are presented in terms of procedures, steps, logic blocks, processing, and other symbolic representations of operations on data bits that can be performed in electronic circuitry or on computer memory. A procedure, computer executed step, logic block, process, etc., are conceived here to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof. In a hardware implementation, for example, a processing unit may be implemented within one or more application specific integrated circuits (ASICs), digital signal processors (DSPs), digital signal processing devices (DSPs), programmable logic devices (PLDs), field programmable gate arrays (FPGAs), processors, controllers, micro-controllers, microprocessors, electronic devices, other devices units designed to perform the functions described herein, and/or combinations thereof.

Throughout this specification, reference may be made to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, processes described herein, with reference to flow diagrams or otherwise, may also be executed and/or controlled, in whole or in part, by such a computing platform.

Wireless communication techniques described herein may be in connection with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), to name just a few radio technologies. Here, CDMA2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Wireless communication implementations described herein may also be used in connection with any combination of WWAN, WLAN and/or WPAN.

FIG. 1A shows satellite vehicles 50 providing signals to a mobile station 40, also referred to as a mobile device 40. As used herein, a handheld mobile device or a mobile station (MS) refers to a device that may from time to time have a position or location that changes. The changes in position and/or location may comprise changes to direction, distance, orientation, etc., as a few examples. In particular examples, a mobile station 40 may comprise a cellular telephone, wireless communication device, user equipment, laptop computer, a personal navigation device, other personal communication system (PCS) device, and/or other portable communication device. A mobile station 40 may also comprise a processor and/or computing platform adapted to perform functions controlled by machine-readable instructions.

A handheld mobile device 40 and/or system may estimate a device's location based, at least in part, on signals received from satellites 50. In particular, such a device 40 and/or system may obtain "pseudorange" measurements comprising approximations of distances between associated satellites and a navigation satellite receiver. In a particular example, such a pseudorange may be determined at a receiver that is capable of processing signals from one or more satellites 50 as part of a Satellite Positioning System (SPS). Such an SPS may comprise, for example, a Global Positioning System (GPS), Galileo, Glonass, to name a few, or any SPS developed in the future. To determine its position, a satellite navigation receiver may obtain pseudorange measurements to three or more satellites as well as their positions at time of transmitting. Knowing the satellite's orbital parameters, these positions can be calculated for any point in time. A pseudorange measurement may then be determined based, at least in part, on the time a signal travels from a satellite to the receiver, multiplied by the speed of light. While techniques described herein may be provided as implementations of location determination in a GPS and/or Galileo types of SPS as specific illustrations, it should be understood that these techniques may also apply to other types of SPS, and that claimed subject matter is not limited in this respect.

Techniques described herein may be used with any one of several SPS, including the aforementioned SPS, for example. Furthermore, such techniques may be used with positioning determination systems that utilize pseudolites or a combination of satellites and pseudolites. Pseudolites may comprise ground-based transmitters that broadcast a PRN code or other ranging code (e.g., similar to a GPS or CDMA cellular signal) modulated on an L-band (or other frequency) carrier signal, which may be synchronized with GPS time. Such a transmitter may be assigned a unique PRN code so as to permit identification by a remote receiver. Pseudolites may be useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

The handheld mobile device 40 and/or system includes a first receiver to receive SPS signals (e.g., GPS signals), a second receiver to receive network information (e.g., a mobile phone receiver or transceiver or a cellular phone receiver or transceiver) and an image capturing device (e.g., a camera). The second receiver to receive the network information may be part of a cellular phone. In these cases, the mobile device 40 may operate as both a camera and a functioning mobile phone allowing a user to have typical mobile phone features such as two-way voice and/or data communication. Alternatively, the second receiver may not be coupled to a functioning mobile phone. In these cases, the mobile device 40 may be considered a camera enhanced with a means of position location (i.e., via network information and via SPS signals) but without the features of a typical mobile phone.

The handheld mobile device 40 and/or system may further include a means for capturing an image, such as a camera, a video camera or other image sensor. The sensor may capture a still image, a moving image with sound, a moving image without sound or a sound track, singularly or in any combination.

The handheld mobile device 40 and/or system may further include a means for determining a position based on an attempt to detect satellite signals and wireless network signal, such as one or more microprocessors, controllers, hardware, firmware and/or software. The handheld mobile device 40 and/or system may further include a means for tagging the image with the determined position including one or more microprocessors, controllers, hardware, firmware and/or software.

In some embodiments, a handheld mobile device 40 comprises a sensor, a wireless receiver or a wireless transceiver, an SPS receiver and a processor. The sensor, often paired with a sensed data processor, is used to capture data. The sensor may be an image sensor to capture still images. Alternatively, the sensor may be an audio sensor used to capture audio tracks. Alternatively, the sensor may be a video sensor used to capture moving pictures. Alternatively, the sensor may include both an image sensor and an audio sensor.

The wireless receiver or wireless transceiver is used to determine network coverage and to obtain position information of one or more base stations, as explained with relation to FIG. 3B below. The SPS receiver, such as a GPS receiver, is used to determine SPS coverage and to obtain position information of the mobile device 40 with respect to one or more satellite vehicles 50. The processor is used to coordinate the image sensor, the wireless receiver or transceiver and the SPS receiver and to combine or tag an image with location information.

Figure 1B:
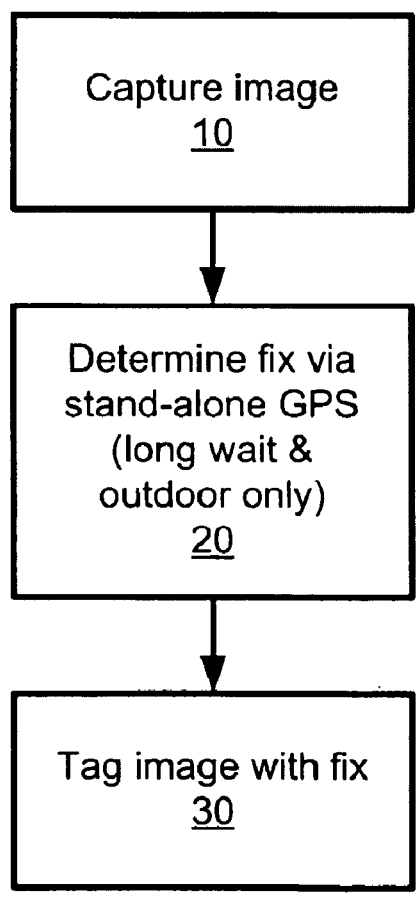
FIG. 1B shows a process to tag images with a location fix.

FIG. 1B shows a process to tag images with a location fix. A digital image may be tagged with an indication of geographical origin, for example, by associating a determined position with the digital image. Alternatively, the tag may be stored in an imbedded field (e.g., a header) within a digital file containing the digital image. Alternatively, the tag may be in the form of a viewable or audible label recognizable when reviewing the digital image (e.g., similar to a date/time stamp on a photograph). The tag may include a latitude and longitude. The tag may also include an altitude. Alternatively or in addition, the tag may be converted to an address, city or region.

At step 10, the mobile station 40 captures image data (e.g., takes a still picture or a video image with or without sound, or records an audio tract). Next at step 20, the mobile station 40 determines a location fix using a stand-alone GPS technology. For example, the mobile station 40 attempts to detect, acquire and demodulate GPS signals from multiple satellite vehicles 50. In the examples provided herein, the references made to GPS signals and a GPS system are referenced by example only. Any of a variety of satellite positioning system (SPS) technologies may be used (e.g., GPS, Galileo and Glonass). Typically, such a mobile station 40 operates best in capturing this GPS signals when it is in an open outdoor environment but unfortunately this process takes a substantial about of time. Eventually, once a location fix is determined, the mobile device 40 tags the image with the location fix (step 30).

Figure 2:
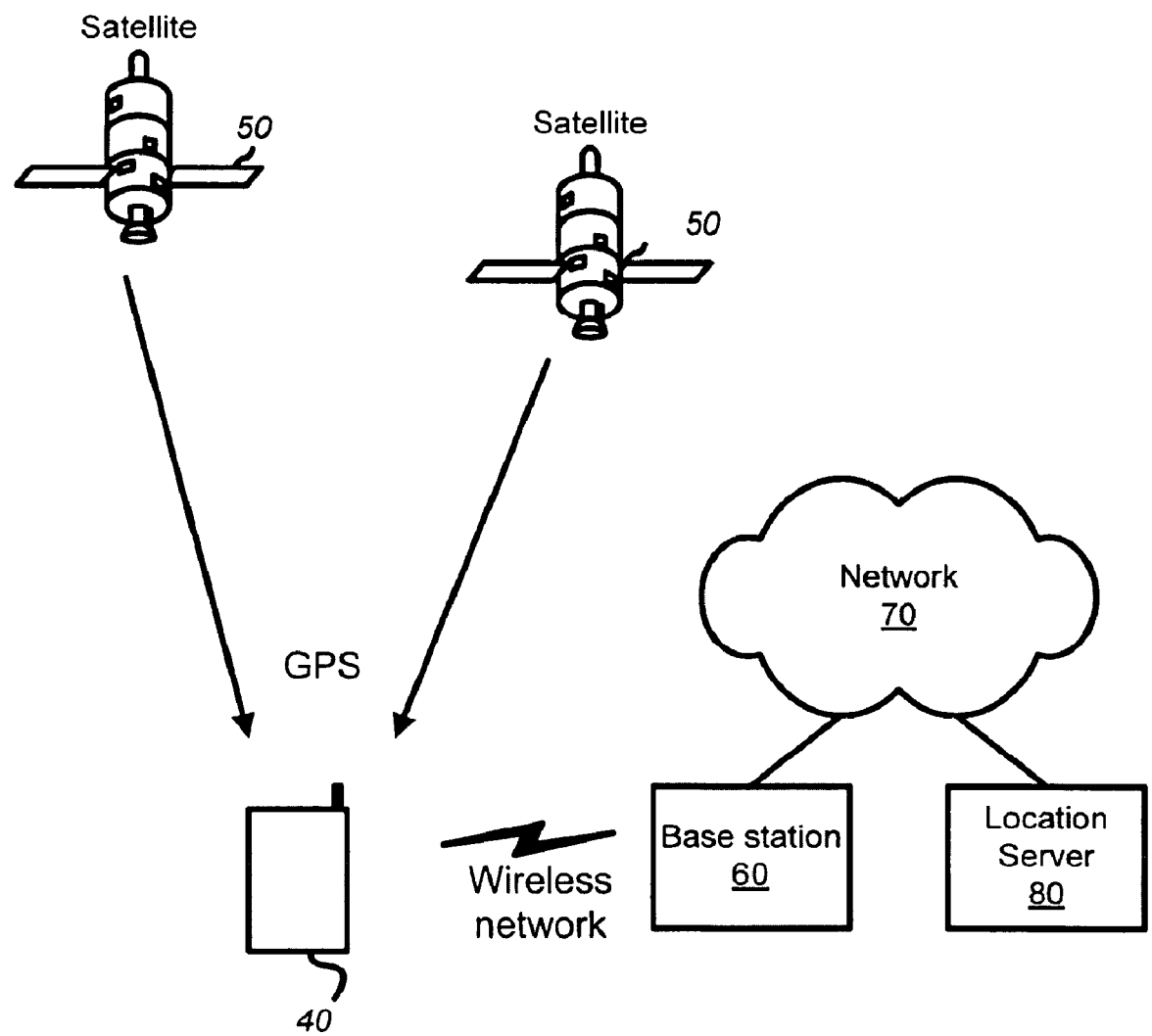
FIG. 2 shows a mobile station in communication with a wireless network and satellite vehicles.

FIG. 2 shows a mobile station 40 in communication with a wireless network and satellite vehicles 50. Some mobile devices 40 are both GPS enabled and are capable of communicating with a wireless network. The wireless network includes a base station 60, a location server (LS) 80 and a network 70. The base station 60 (e.g., base transceiver stations (BTS), base station controller (BSC), access points and the like) includes a radio transmitter and receiver and is used to connect voice and data calls in a particular cell to and from mobile phones and a network. A location server 80 cooperates with mobile stations in determining the location of the mobile stations. The location server may roughly locate a mobile station 40 by knowing which base station 60 the mobile station 40 is connected to on the network. Further, the location server 80 may send assistance data to the mobile station 40, comprised of almanac and ephemeris satellite orbital data, time information, doppler window and other search assistance data to assist the mobile station 40 in more quickly locking onto available satellites. The location server 80 may also receive raw location data from the mobile station 40. Since the location server 80 has more computation power than a mobile station 40, it can better process signals relayed to it from a mobile station 40. Such a configuration allows a mobile station 40 to reduce the amount of CPU processing power required for a GPS position location by offloading most of the computations onto the location server 80. The network 70 includes various network interconnecting components (e.g., base station controller (BSC), mobile switching center (MSC), Public Switched Telephone Network (PSTN), and the like).

In accordance with the present invention, a single device has the functionality of an image capturing device (e.g., a camera), a mobile station (e.g., a cellular mobile phone), and a position location device (e.g., a GPS unit). Simply combining the three devices into a single housing, however, may provide insufficient usability and leads several drawbacks. First, more than one battery or power source may be needed. Second, such integrated devices share no circuitry; therefore do not readily share information. Third, image capturing, mobile phone operation and position location naturally conflict. Fourth, duplicative hardware is used. For example, three devices may each have a processor, where the processor may not have access to the state of the other two processors, limiting the ability to share information advantageously.

Assuming, the three separate devices integrated into a device having a single processor for the three device functions, several other drawbacks may be encountered. For example, contention may occur between a position location task executing and a capturing image task executing. Position location requires a significant amount of processing power thereby causing the capturing task encounter significant latency when a user attempts to capture an image in parallel to the position location engine running. Therefore, a priority scheme may be necessary if the processor has insufficient processing power. For example, capturing an image could halt position location when a user begins to capture an image. However, the position location task may need to be restarted once the user completes capturing images.

Several of the embodiments described below alleviate one or more of these drawbacks. Such embodiments may include one or more processor coupled to coordinate communication and interactions among multiple functional tasks to advantageously provide enhanced features and user experiences.

A multiprocessor solution may include shared memory to allow tasks running on separate processor to communicate. For example, a position location task running on a first processor may periodically determine a location and store that determined location in a share memory location (e.g., memory having two busses for accessing a memory location). A capturing image task may be running on second processor. After each image is captured, the capturing image task may access the shared memory to retrieve the latest position stored in the shared memory.

A single processor solution may run two or more tasks in parallel, if sufficient processing power is available. For example, a capturing task may call a position location task as a daughter task. Alternatively, a single processor may execute tasks in series. For example, each task may be assigned a different priority thereby allowing one task to have a higher priority and interrupt a lower priority task device. Hardware may first execute a position location task, and then allow an image capturing to temporarily suspend the position location to facilitate image capturing. The position location task may resume from where it was interrupted once the capturing image task completes its processing.

In some embodiments, a position location engine is idle until a user begins capturing images. Once processing power is available after the user begins capturing images (e.g., once a user has finished capturing an image or series of images, or alternatively, once a user begins capturing a first image), the capturing image process starts the position location engine. When a position fix becomes available, a tagging operation (e.g., by a separate tagging task or alternatively by the image capturing task or the position location task) goes back and tags each image that are waiting for a position location tag. Once the capturing image process is complete and images are tagged, the image capturing task may instruct the position location task to return to an idle state.

Furthermore, other configurations are possible as described in more detail below.

Figures 3A, 3B:
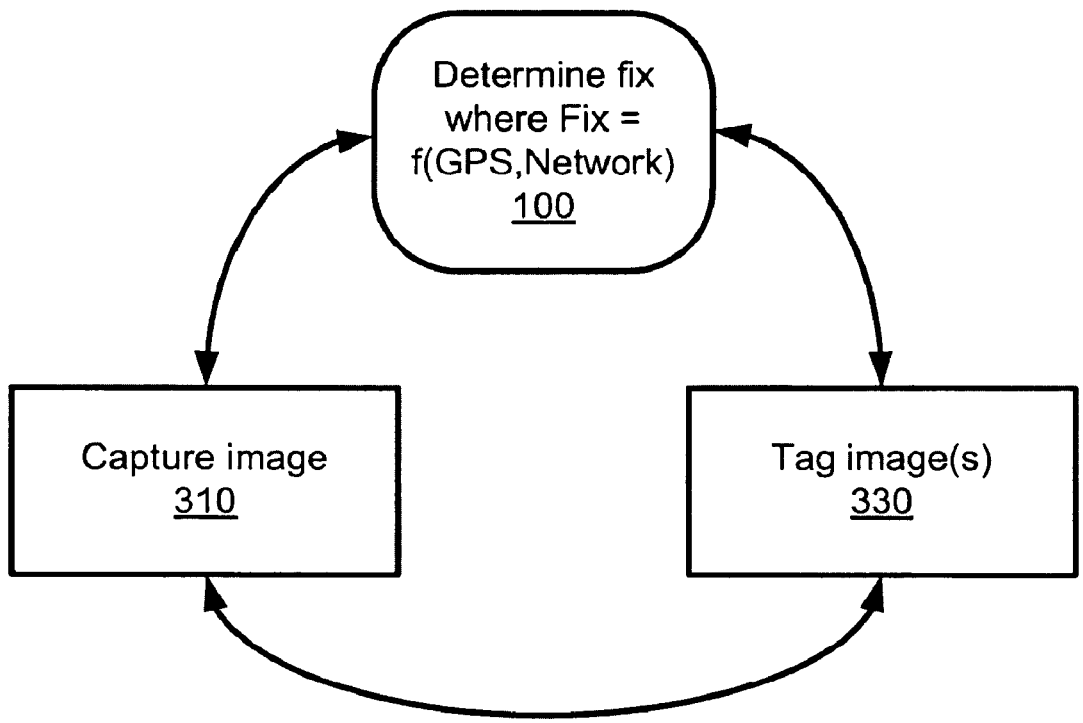
FIGS. 3A and 3B show a state diagram and a truth table, in accordance with some embodiments of the present invention.

FIGS. 3A and 3B show a state diagram and a truth table, in accordance with some embodiments of the present invention. A mobile station with limited processing power and limited battery power may operate in one of three active modes: state 100, state 310 and state 330. Depending on a particular circumstance, the mobile station may transition from any one state to any other state. At state 100, the mobile station is determining a location fix based on the quality and availability of data from a GPS satellite system and a wireless network. A location fix may be determined solely from data received from one or more GPS satellites, solely from data received from one or more base stations, or from data received from both GPS satellites and one or more base stations. For example, a location fix may be from an identifier broadcast by a base station (e.g., an identification of a cell or access point) or may be determined from weighting a plurality of locations each associated with a terrestrial base station.

A mobile station enters state 100 when it is not capturing images and when a valid location fix is not available. A determined position may be a single position, an average of positions, weighed averages of positions, a time averages of positions, or the like. For example, a position may consist of an interpolation of a sequence of positions. For example, for a video image, an interpolation of positions just before and just after the video was captured may be used as the determined position. A mobile station interrupts state 100 when a user initiates a process of capturing images and may exit state 100 once a sufficient location fix has been determined. Alternatively, the mobile station may interpolate one or more positions determined by one or more of the following means: stand-alone GPS position determination, MS-based position determination, MS-assisted position determination and/or stand-alone GPS position determination with long term orbit information.

At state 310, the mobile station is in the process of capturing images. A mobile station enters state 310 when a user activates a capture or record button. A mobile station exits state 310 once the image capturing process is complete (e.g., after a predetermined time from last capturing an image). At state 330, the mobile station tags previously captured images. The mobile station enters this state once a captured image exists without a position tag when a sufficient location fix exists. The mobile station may also enter state 330 at the direction of a user.

FIG. 3B shows how a mobile station may determine a location fix based on the existence of network signals and/or GPS signals. The mobile station determines a position based on an attempt to detect satellite signals and a wireless network signal. Depending on the existence and quality of the satellite signals and a wireless network signal, the mobile station selects a method to determine a position fix. The mobile station selects one of the modes in order to determine a position. in a first mode (stand-alone GPS mode), the mobile station uses only signals from a GPS system. In a second mode (assisted-GPS mode), the mobile station uses signals from both the GPS system and a wireless network. In a third mode (network-information mode), the mobile station uses only signals from the wireless network. The mode selected by the mobile station depends on the availability and quality of the received signals. If no signals are available, the mobile station may operate in a fourth mode where it prompts the user for a position.

Though GPS signals are discussed here, other types of SPS signals may equally be used in addition to GPS signals or instead of GPS signals. For example, rather than using a stand-alone GPS signal, one may equivalently use a stand-alone Gallieo mode, a stand-alone Glasnos mode or a combination of two or more different SPS signals. For example, GPS signals and Glasnos signals may both be acquired and processes to assist in determining a position.

A mobile station may select the stand-alone GPS mode based on GPS signals meeting a first threshold. The threshold may be related to a quality of the GPS signals and/or a quantity of the GPS signals. For example, a mobile station first determines whether a good GPS coverage is available. For example, if a predetermined number of GPS signals (e.g., 3, 4, 5 or 6). each having a sufficient signal quality, are available at the mobile station then the mobile station could declare good GPS coverage and base position determination from stand-alone GPS technology. Shown as option 1 this conventional GPS technology may provide reliable positions in strong signal conditions, therefore, using other technologies may be unnecessary. In poor signal conditions (e.g., when surrounded by tall buildings or trees or inside of buildings), stand-alone GPS works less reliably. Additionally, in poor signal areas, a mobile station 40 may not be able to received almanac and ephemeris data from the satellites.

The mobile station may select to use the assisted-GPS mode based on the GPS signals meeting a second threshold lower than the first threshold, and further based on the availability of network information. If available GPS satellites provide only poor coverage (e.g., a low number of satellites and/or a lower than desired signal quality) but the mobile station can access a base station (BS) signal, the mobile station may determine its position using assisted GPS (A-GPS) technology or based on a transmitted identification of a cell or access point from a base station. In A-GPS, the mobile station may receive almanac and ephemeris data from a base station rather than waiting or trying to demodulate it from a satellite. With this assistance data, the mobile station may more advantageously use poor GPS signals in finding its position.

Alternatively, shown as option 2, the mobile station may select the assisted-GPS mode based on the GPS signals meeting a first threshold, and further based on the availability of network information. If a mobile station has good GPS coverage and also has network coverage, it may use the assisted-GPS mode, possibly for a more rapid position fix.

In assisted-GPS mode, the mobile station may receive assistance data from the network and used this assistance data to more efficiently capture the GPS signals. Alternatively or in addition to, the mobile station may compute first location using GPS signals and a second location using only network information. The location based on only network information (described below) may be based on the location of one, two, three or more base stations. The first and second locations may be averaged (e.g., by weighing the two locations based on uncertainty) to determine a third position, which the mobile station may use as its determine location. Alternatively, a series of locations may be accumulated to produce a determined location.

The mobile station may select the network-information mode based on the GPS signal not meeting the second threshold, and further based on the availability of the network information. If no GPS signal is available (i.e., the mobile station is in a location where it has no GPS coverage), the mobile station may use only network information acquired from the base station signal in setting its location fix. In a network-information mode, the mobile station uses only network information in determining a position. For example, the mobile station may use trilateration or triangulation. Trilateration determines the relative positions of base stations in a similar fashion as triangulation. Unlike triangulation, which uses angle measurements (together with at least one known distance) to calculate a location of a mobile station, trilateration uses locations of two or more base station, and distances between the mobile station to each of these base stations. To determine the location of a mobile station on a 2-dimensional plane using trilateration alone, it generally uses the location of at least three base stations, however, a location with a higher uncertainty may be computed with the location of only one or two base stations.

The mobile station may select an offline mode based on a lack of GPS and network signals. If no GPS signal is available and the mobile station is in an out-of-service (OOS) area, no location fix is available. In this case, when tagging an image, a mobile station may use its last known location fix, allow the user to provide a fix manually, or alternatively, may leave the fix blank.

Figure 4:
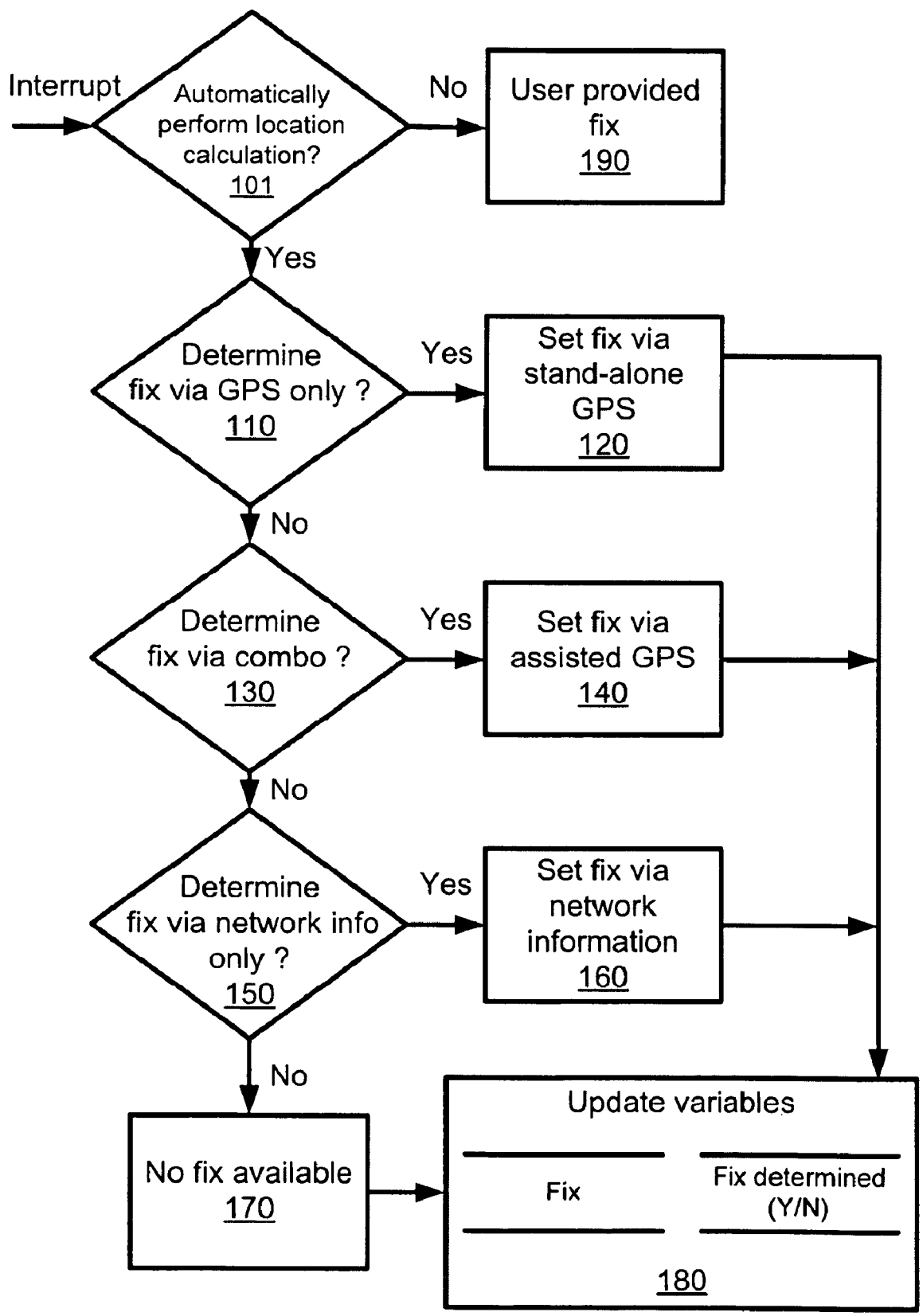
FIG. 4 shows a flow chart for determining a means to set a location fix, in accordance with some embodiments of the present invention.

FIG. 4 shows a flow chart for determining a means to set a location fix, in accordance with some embodiments of the present invention. At step 101, the mobile station begins the location fix determination process to determine whether to allow a user to manually provide a location fix or to automatically perform a location calculation. Step 101 may be entered, for example, as a result of an interrupt. If manually calculated, processing continues at 190. If automatically calculated, processing continues at 110. At 190, a user provides a fix or location (e.g., longitude and latitude, a street address, a textual description), At 110, the mobile station determines whether a location fix via stand-alone GPS is possible. For example, if the mobile station has good GPS coverage or has current Ephemeris and Almanac information. If so, at 120, the mobile station determines and sets its location fix via stand-alone GPS only. If not, at 130, the mobile station determines whether a location fix may be determined using a combination of technologies. For example, if GPS coverage is available but poor and the mobile station has a connection with a base station, the mobile station continues to 140. At 140, the mobile station determines and sets its location fix via assisted GPS. For example, the mobile station first receives assistance data from the wireless network via the base station.

Next, the mobile station uses this assistance data to acquire GPS signals and to determine a location fix. If there is no GPS coverage, the mobile station proceeds to 150 where it determines whether it may determine a location fix bases solely from network information. That is, if there is no GPS signal but there is a connection to the network via a base station, the mobile station may use information it receives from the base station to provide a coarse location fix. At 160, the mobile station determines and sets its location fix via network information.

If there is no GPS coverage and the mobile station is in an out-of-service (OOS) area, the mobile station proceeds to 170 where it determines no fix is presently available. In some embodiments, if no fix is available, the user is queried to enter a manual fix. If a location fix is available (from 120, 140 or 160) or no fix is available (from 170), then at 180, the mobile station may appropriately update a variable containing the current location fix and a flag indicating that a location fix has been determined.

FIGS. 5A and 5B illustrate screenshots, in accordance with some embodiments of the present invention. A user may determine what location fix is used for tagging images. That is, a user may set one or more configurable parameters to indicate to the mobile device what one or more positions will be used in relation to capturing one or more images.

FIG. 5A shows a configuration screen. A user may select whether a location fix is determined before or after an image is captured. With a first option, the user instructs the mobile station to use a location fix determined after the image is captured. With a second option, the user instructs the mobile station to use a location fix determined before the image is captured. With a third option (not shown), the user instructs the mobile station to use a best location fix available e.g., determine two fixes—one before and one after the image is captured—then use the location fix that is closest in time to the capturing of the image). A user may also set how often images are tagged with a new location fix. For example, a user may select that every image has its individual location fix determined. Alternatively, a user may select that a location fix is determined for the first in a series of captured images. That is, a location fix is determined for the first captured image then subsequent images (e.g., images within a predetermined number of seconds from the first image or from a previous image) are tagged with the same determined location fix as used for the first captured image.

Other variables may be user configurable or system configurable as well. For example, a variable may be set or cleared to enable or disable a capture image process from interrupting the location processes (e.g., capture image 310 and determine fix 100 described below with reference to FIG. 7C). For example, if the variable is set, a user attempting to capture an image halts the location process. If the variable is cleared, the user attempting to capture an image would be forced to wait until the location process is complete.

FIG. 5B shows a screenshot used during a batch mode. The screenshot includes a list of options and a listing of images. The listing of images shown is a list of previously captured images available within the mobile station. The listing of images may be filtered or ordered based on a quality of location fix (GPS fix, coarse fix, no fix) and/or a date and time the image was captured. For example, only untagged images may be listed, or alternatively, only images without a GPS location fix may be listed. In addition, the images may be displayed as a list with associated attributes or as reduced images (thumbnails).

In a batch mode, a user may tag a number of images at one time. For example, if a set of images selected from a listing of images is tagged with no fix, the user may instruct the mobile station to set a location fix to this set of images. Additionally, if a set of images is tagged with only a coarse location fix, the user may instruct the mobile station to t a new location fix. With a first option, the user instructs the mobile station to use the last location fix available in the mobile device to tag a set of images the user has selected from a listing of images. With a second option, the user instructs the mobile station to get a new location fix and tag the selected set of images with this new location fix. With a third option (not shown), the user enters a fix manually (e.g., a text description of the location, an address, GPS coordinates, or the like) and instructs the mobile station to tag a selected set of images with the manually entered fix.

FIGS. 6A, 6B, 6C, 6D, 7A, 7B, 7C, 8A, 8B, 8C, 9A, 9B and 9C show time-line diagrams and flow charts illustrating various normal and interrupted modes of operation for a mobile station, in accordance with some embodiments of the present invention. The mobile station balances among capturing images, determining a location fix and tagging images. The figures show four states of a camera of a mobile station: a camera idle state 200 and three active states—a capturing image state 210, a determining location fix state 220 and a position tagging state 230. Each begins in a camera idle state 200, or equivalently, in a waiting state 300. This state may be entered once the mobile station is powered on and waiting for a user input, or alternatively, once the camera (or other recording device) is powered on and waiting for a user input.

Figure 6A:
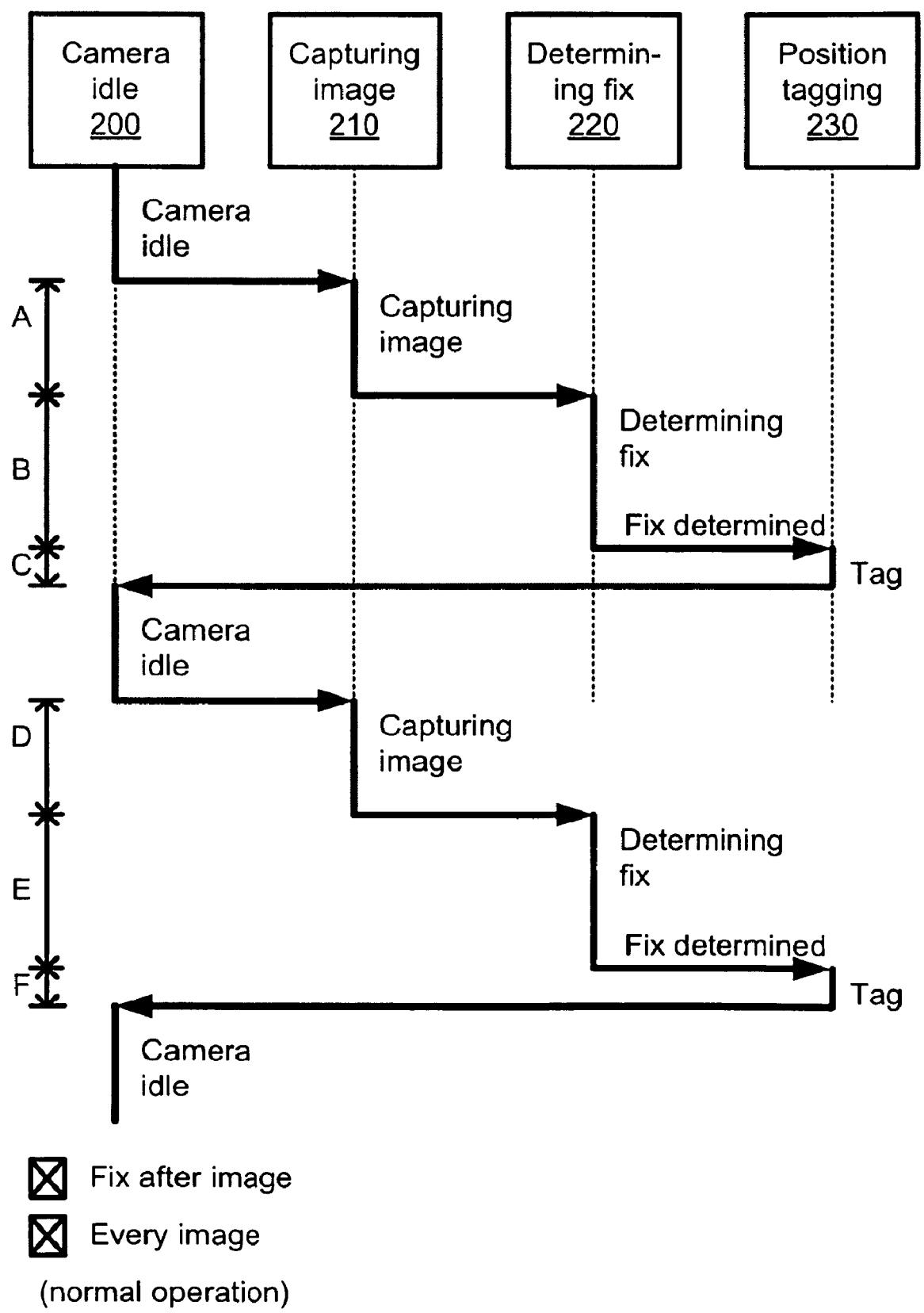
FIGS. 6A, 6B, 6C, 6D, 7A, 7B, 7C, 8A, 8B, 8C, 9A, 9B and 9C show time-line diagrams and flow charts illustrating normal operation of a mobile station, in accordance with some embodiments of the present invention.

FIGS. 6A, 6B, 6C and 6D show an example where the mobile station is configured to acquire a location fix, for each image, after the image was captured. As shown in FIG. 6A, the mobile station exits the camera idle state 200 as a user initiates capturing of an image, thereby entering state 210. An image is captured during the duration 'A'. Once image capturing is complete, the mobile station begins to determine a location fix by entering state 220. The mobile station determines a location fix based on a combination of availability of good, poor or no GPS signals as well as the availability of a base station signal or being in an out-of-service (OOS) area as described above with reference to FIG. 3B. The mobile station operates over a duration 'B' to determine a location fix. Once a location fix is determined, the mobile station tags the image with the determined location fix by entering state 230, which take a very short amount of time 'C' until the mobile station returns to the idle state 200. This process repeats itself with a subsequent user action to capture a second image (at 'D') followed by a new position determination (at 'E') and finally the image is tagged (at 'F').

Figure 6B:
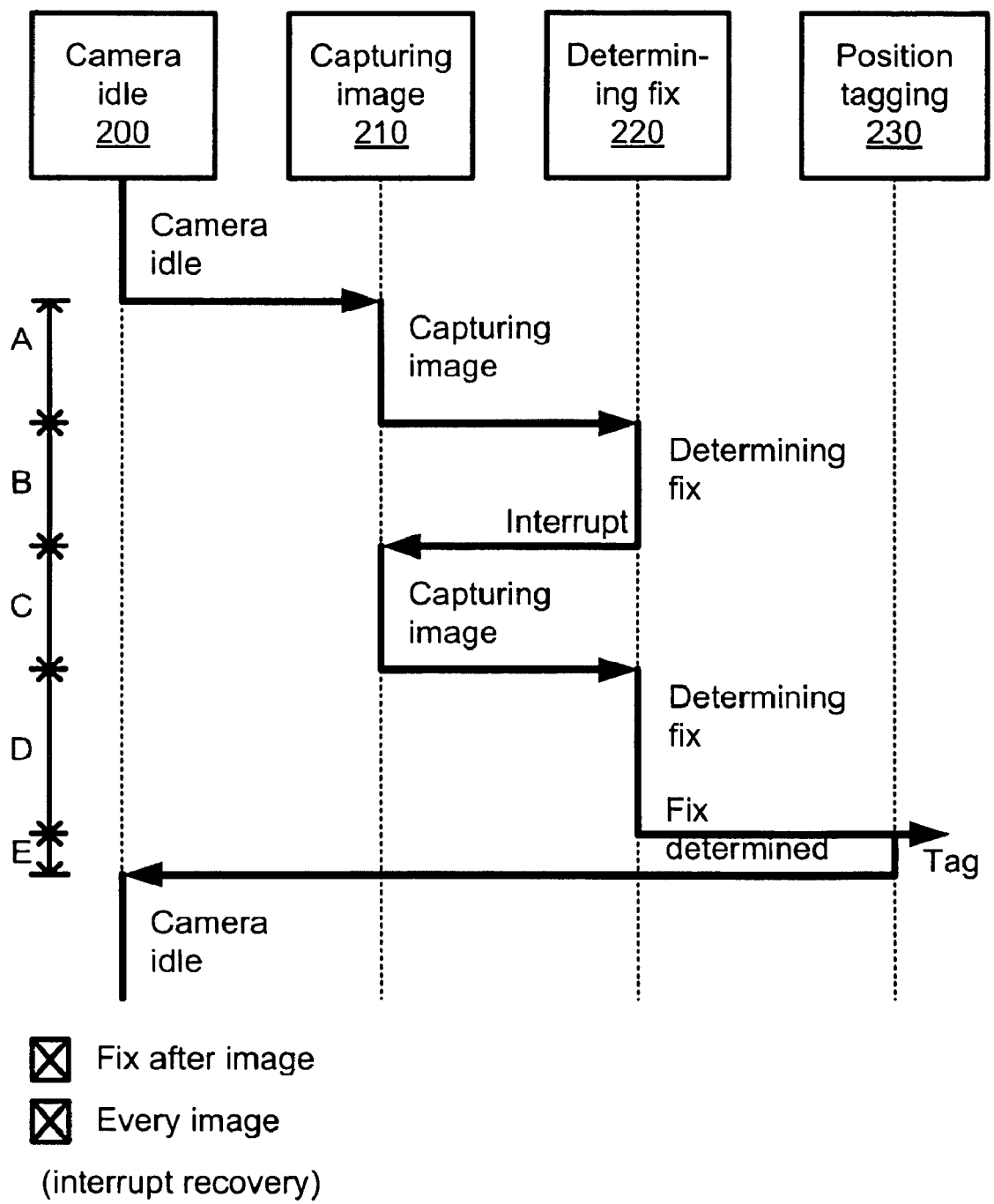

FIG. 6B shows a mobile station capturing a sequence of images. From an idle state 200, a mobile station begins capturing an image (state 210) during a duration of Lime 'A'. Once the image is captured, the mobile station determines a location fix (state 220) over a duration of time 'B'. In this example, before a location fix may be determined, a user interrupts the location fix determination process by beginning to capture a second image (re-entering state 210). During 'C', the second image is captured. Next, the mobile station re-enters state 220 to complete determination of a location fix during duration 'D'. Once a location fix is determined, the two previous images just captured are tagged with the determined location fix (state 230) during duration 'E'. The camera returns to its idle state 200 once the images are tagged.

Figure 6C:
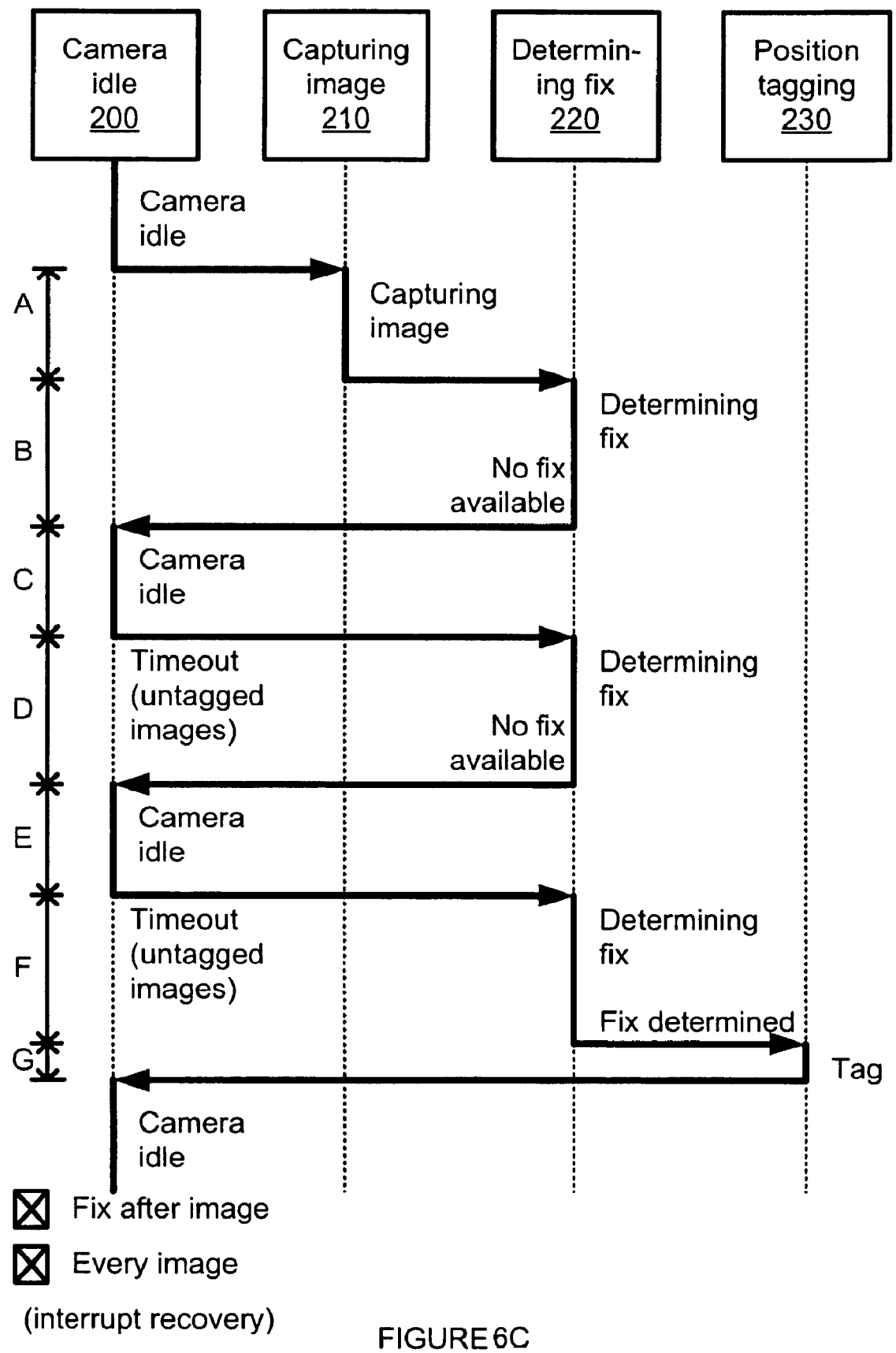

FIG. 6C shows capturing an image followed by a series of attempts to determine a location fix. At 'A', a mobile station leaves an idle state 200 and enters state 210 to capture an image. At 'B', the mobile station attempts to determine a fix but is unsuccessful, for example, if the mobile station is in an OOS area with no GPS coverage. The mobile station may set a timer with a predetermined value and re-enter the idle state 200 for a duration of 'C'. At 'D', the timer times out and the mobile station attempts a second time to determine a location fix. Again, in this example, no fix is available. The mobile station again sets the timer and waits for a duration of 'E' in the idle state 200. Once more at 'F', the timer times out and the mobile station re-enters the determine location fix state 220. In this example, a location fix is determined. At 'G', the mobile station enters state 230 and proceeds to tag the image captured earlier. Finally, the mobile station returns to the idle state 200.

Figure 6D:
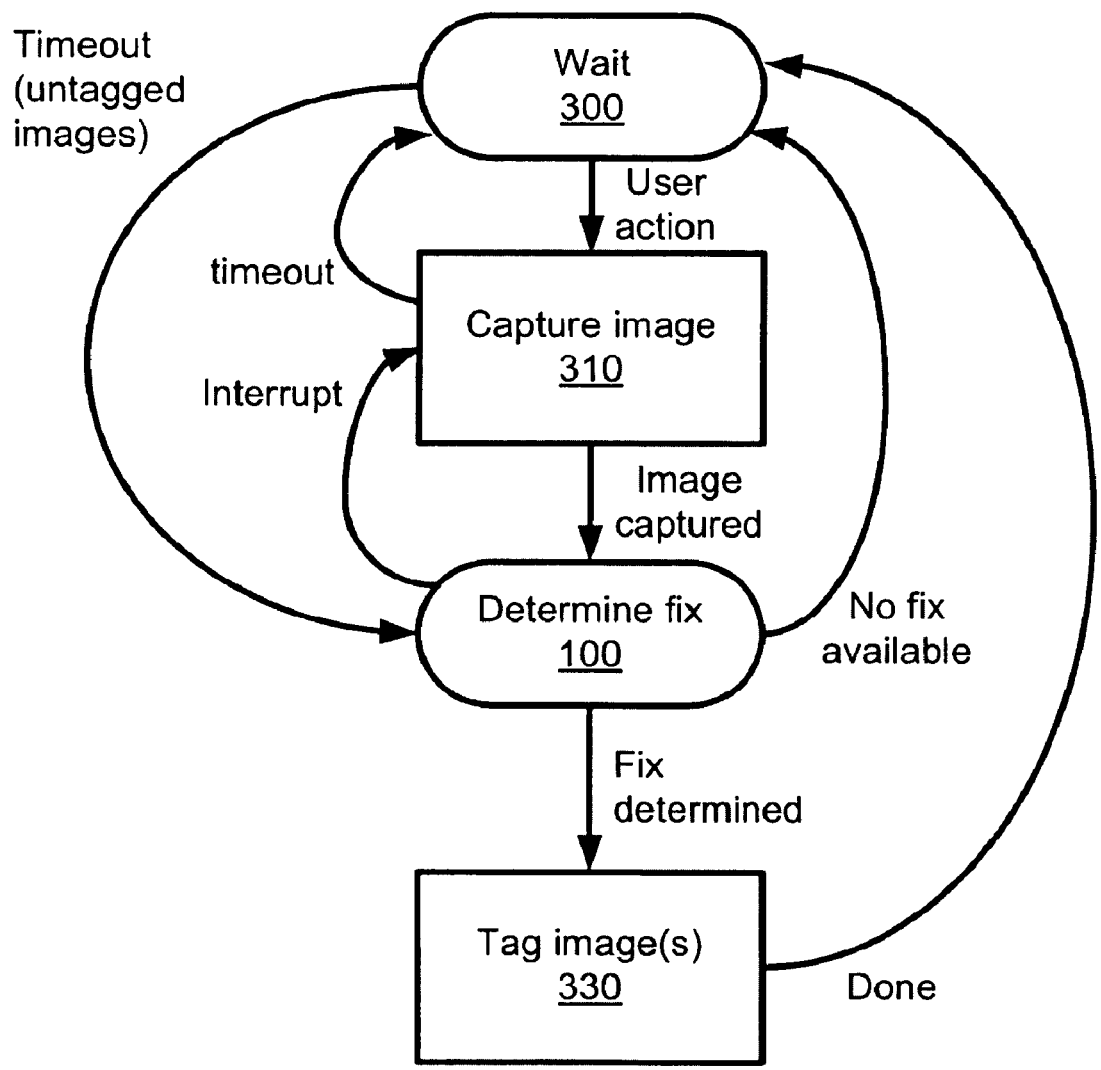

FIG. 6D shows a flow diagram summarizing events and actions for a mobile station configured to acquire a location fix, for each image, after the image was captured. The flow may begin in a waiting state 300 (equivalent to idle state 200). The mobile station may exit state 300 if the user initiates capturing of an image. Alternately, the mobile station may exit state 300 if the user enables a camera mode. Additionally, the mobile station may exit state 300 if a timeout occurs. In state 310, the mobile station begins to capture an image or a tight sequence of images. Once a final image is captured, the mobile station may exit state 310 and enter state 100 to begin the location fix determination process. If state 310 was entered but no image was captured, the mobile station may time out and return to waiting in state 300. At state 100, the mobile station begins the process of determining a location fix. The mobile station exits state 100 if a location fix is determined (thereby entering state 330), if no fix is available (thereby setting a timer and returning to a waiting state 300), or if a user causes an interruption by beginning the image capturing process (at state 310). At state 330, the mobile station tags the untagged captured image (or sequence of images) and returns to the waiting state 300.

Figure 7A:
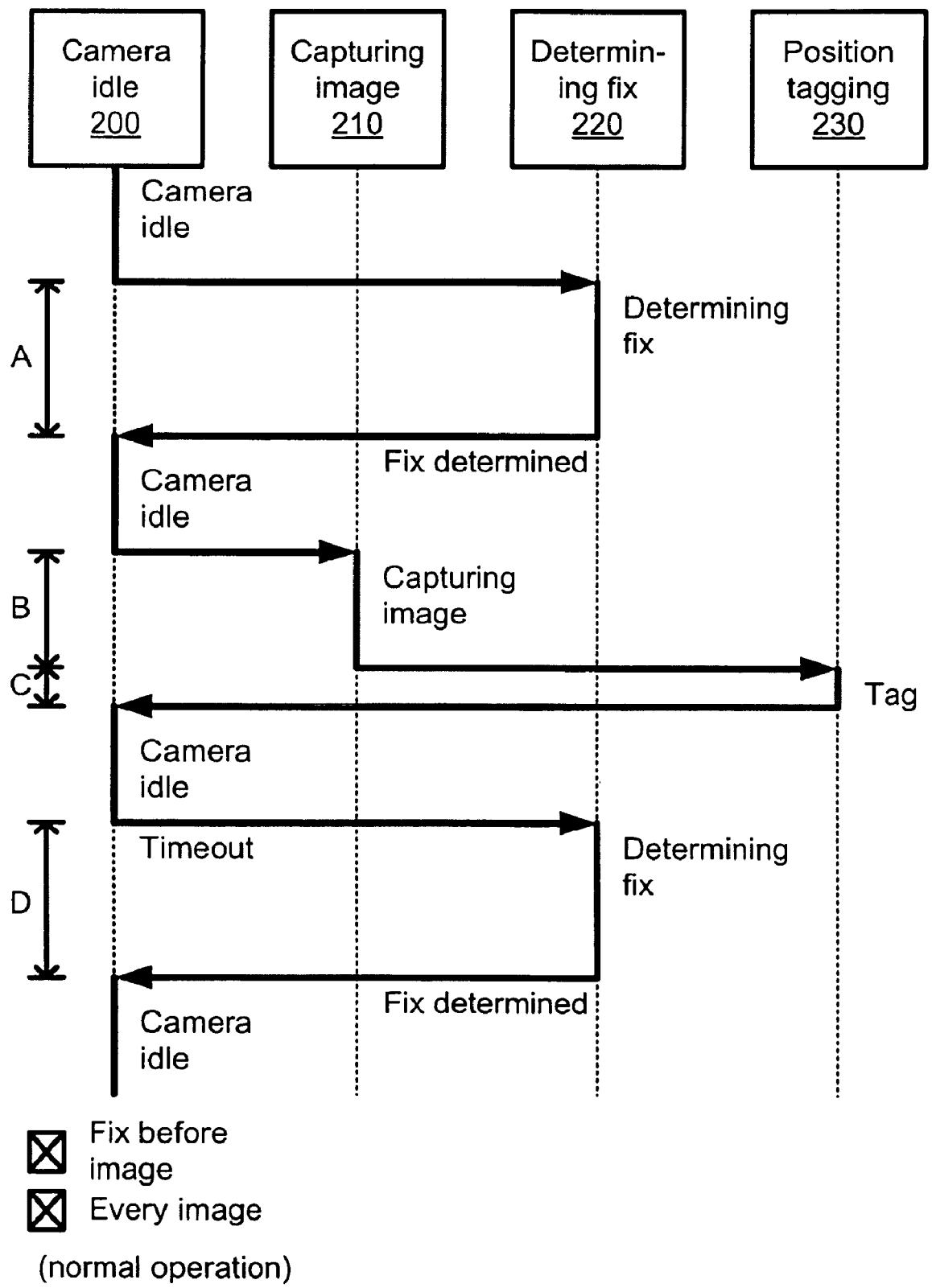
Figure 7B:
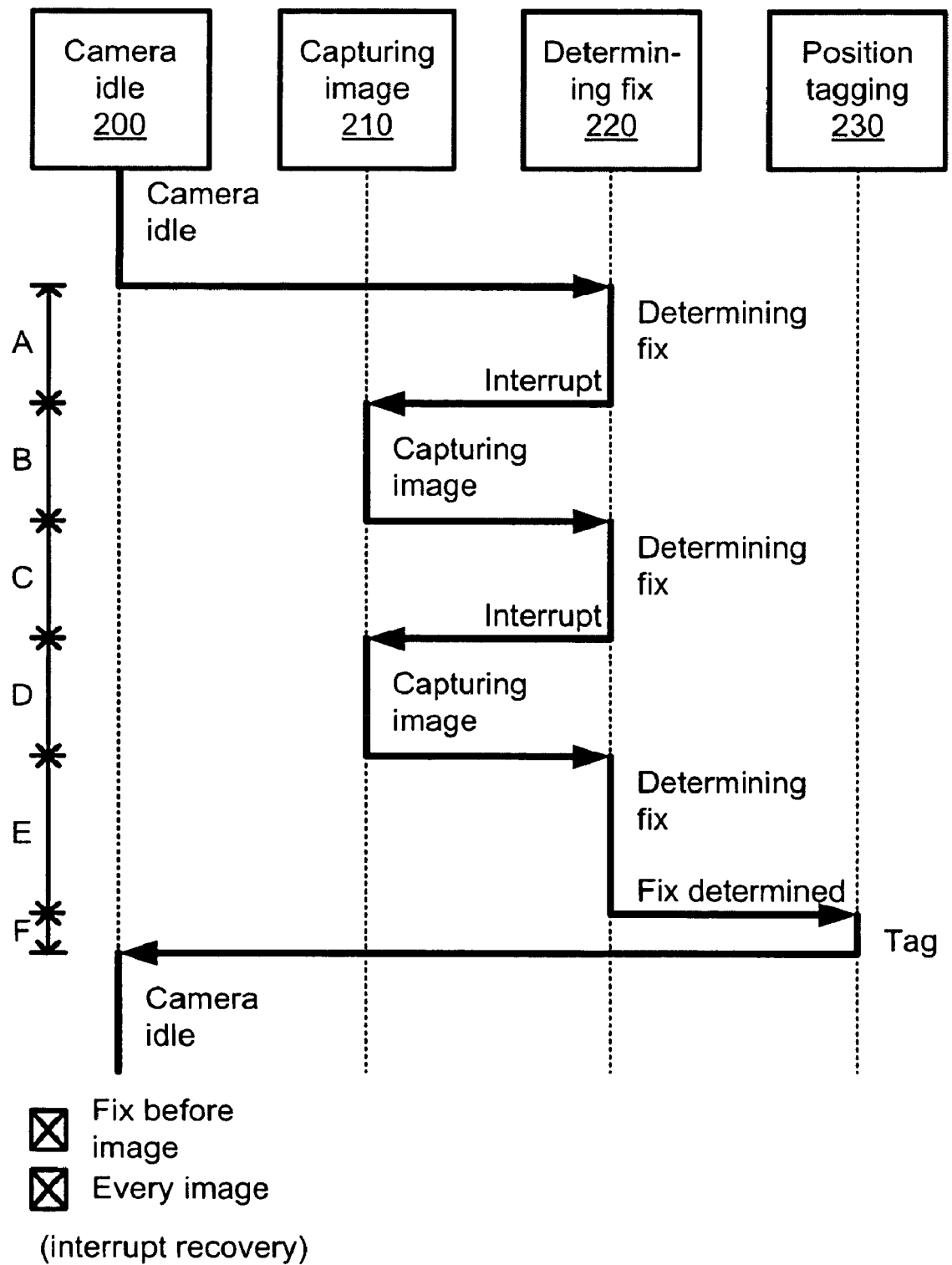
Figure 7C:
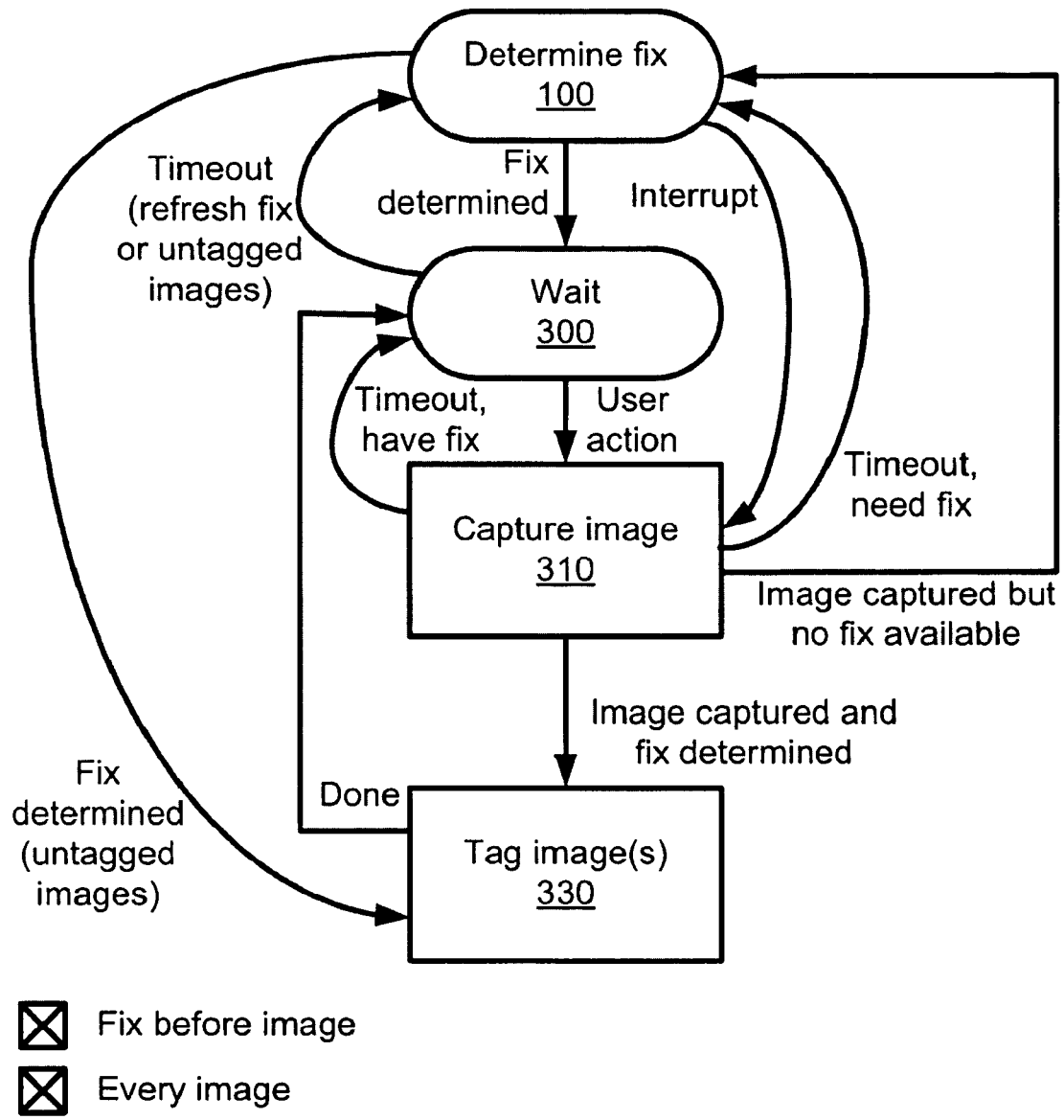

FIGS. 7A, 7B and 7C show an example where the mobile station is configured to use a location fix acquired, for each image, before the image was captured.

In FIG. 7A at 'A', a mobile station exits an idle state 200, enters state 220 to determine a location fix, determines that fix and saves it to memory. The mobile station may set an expiration timer such that when the timer expires, the current location fix is refreshed with a new location fix. For example, the expiration timer may be set to a predetermined duration of time (e.g., 5, 10, 15, 20, 25, 30, 45 or 60 minutes). In this way, the mobile station has an accurate location fix, or nearly accurate location fix, for future time stamping. After the expiration timer is set, the mobile station reenters the idle state 200. Some time later or within a predetermined time later, the user causes the mobile station to enter state 210 to capture an image at 'B'. Because the mobile station already has a valid location fix saved to memory, the image may be immediately tagged during duration 'C' in state 230. Once tagged, the mobile station may reenter the idle state 200. In this example, the expiration timer expires indicating the current location fix should be refreshed. During 'D', the mobile station enters state 220, determines a new location fix and saves it to memory replacing the previous location fix. In this configuration, a location fix is taken but may not necessarily be used and, if used, is used for an image captured after the location fix was determined.

FIG. 7B shows a sequence of events where a position determining process is interrupted by a user capturing images. At 'A', the mobile station enters state 220 to begin location fix determination. The user interrupts this process by beginning to capture a first image (at 'B' in state 210). Once image capturing is complete, the mobile station reenters state 220 at 'C' to continue the location fix determination process. This example shows a second interruption of this process by the user again entering state 210 to capture an image at 'D'. Once complete, the mobile station continues again with the location fix determination process (at 'E' in state 220). Finally, the process determines a location fix and tags the untagged images previously captured (at 'F' in state 230). The mobile station then returns to the idle state 200.

FIG. 7C shows a flow diagram summarizing events and actions for a mobile station configured to acquire a location fix, for each image, before an image was captured. When the mobile station is configured to use a location fix acquired before an image is captured, processing begins with state 100 to determine a location fix. The mobile station may exit state 100 if the process determines a location fix (thereby exiting to wait state 300) or if an interrupt occurs (thereby exiting to state 310), for example, by a user trying to capture an image. At state 300, the mobile station is waiting for a user action or a timeout. If a user initiates the capturing of images, the mobile station proceeds to state 310. If the mobile station captures an image and a location fix is available, the mobile station proceeds to state 330 to tag the image. On the other hand, if an image is captured but no fix is available, the mobile station returns to state 100 to determine a location fix. If, after a predetermined timeout period, no image is captured, the mobile station may timeout and return to determining a location fix (at state 100) if a location fix is needed or may timeout and return to waiting (at state 300) if no fix is needed. State 300 may be configured to timeout once a location fix becomes stale and needs to be refreshed or if no fix has been available for a predetermined duration of time. At expiration of this refresh timer, the mobile station exits state 300 to determine a new location fix at state 100. Once a new location fix is determined, the mobile station may exit state 100 and enter state 330 to tag any untagged images.

Figure 8A:
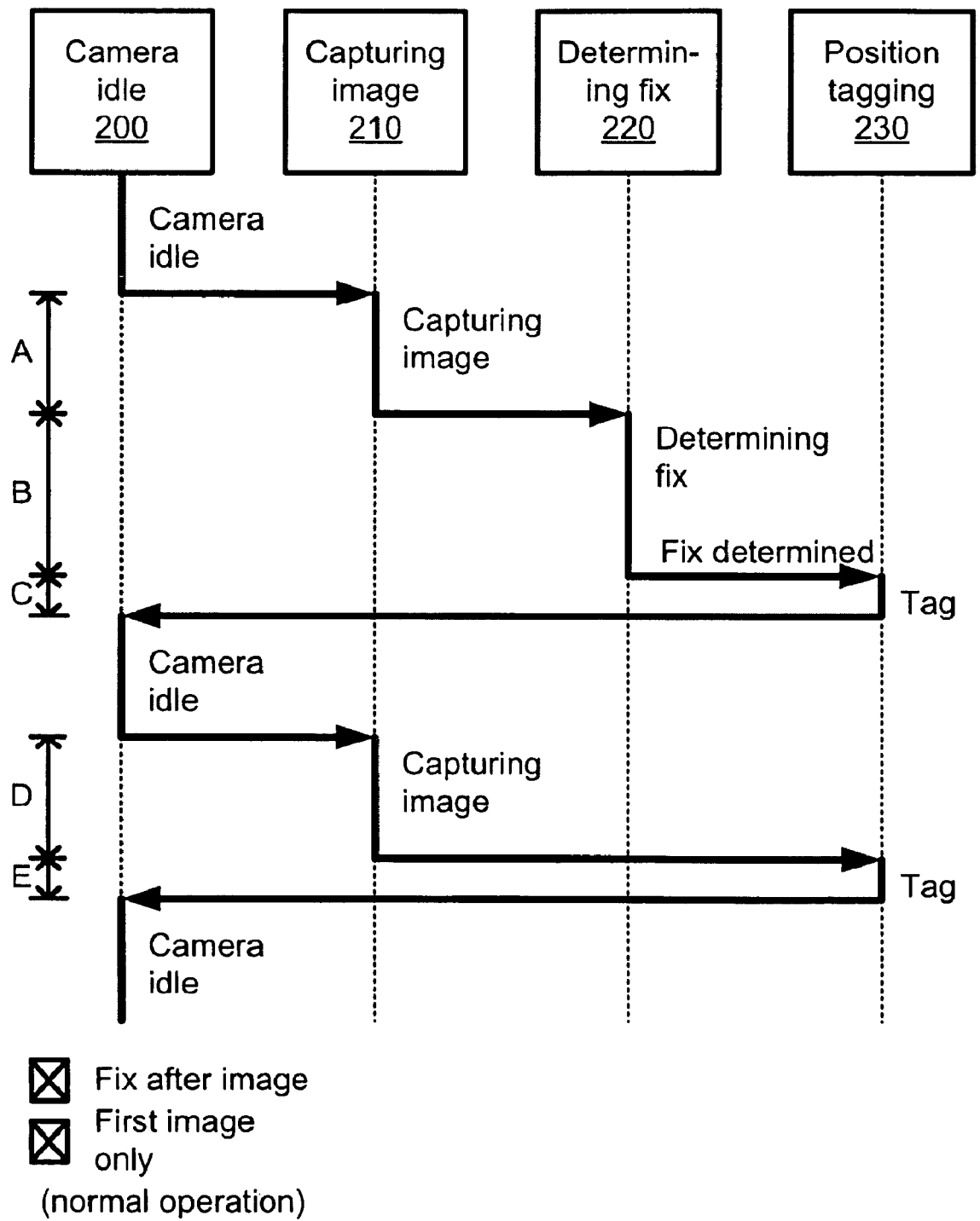
Figure 8B:
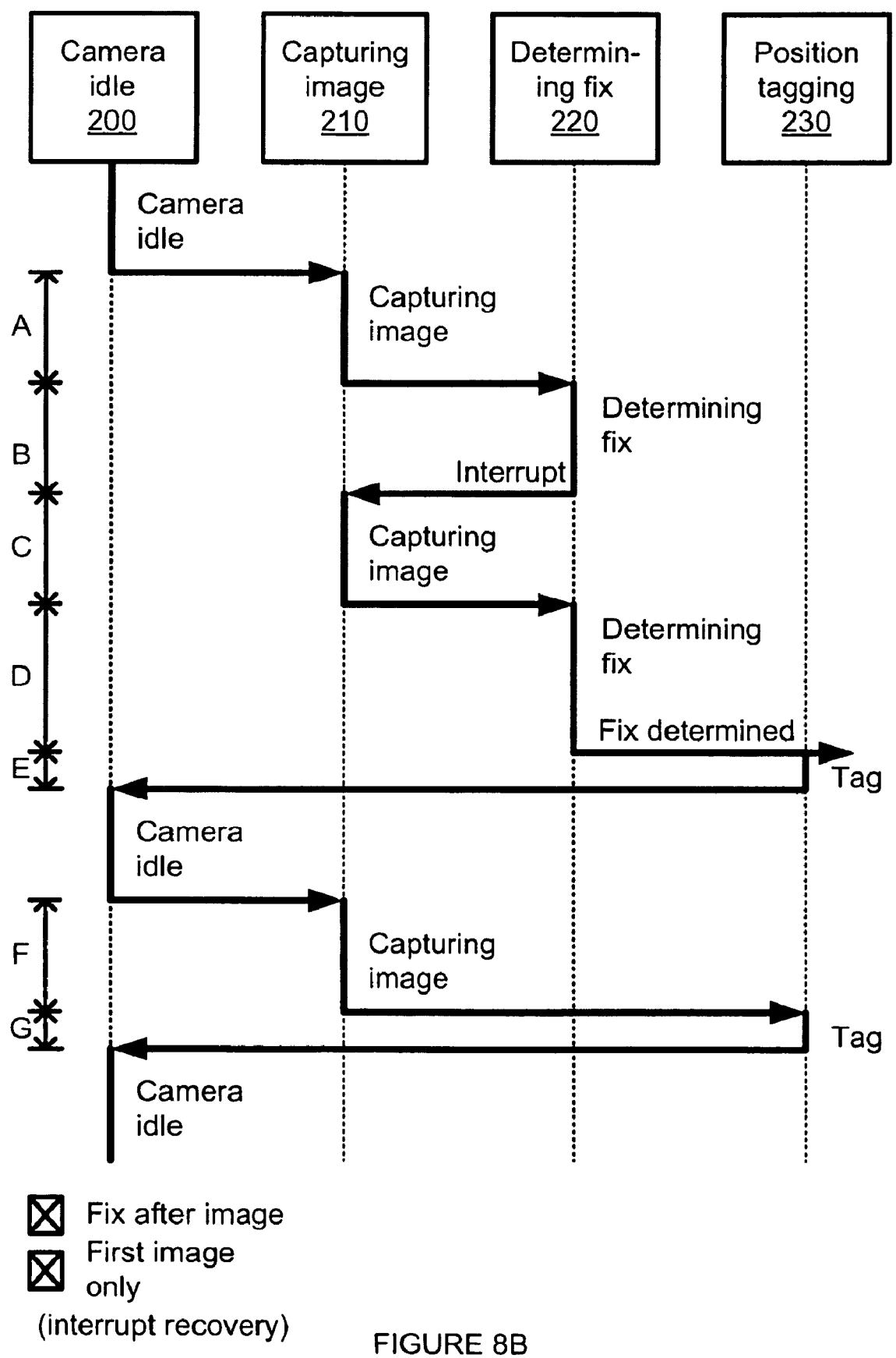
Figure 8C:
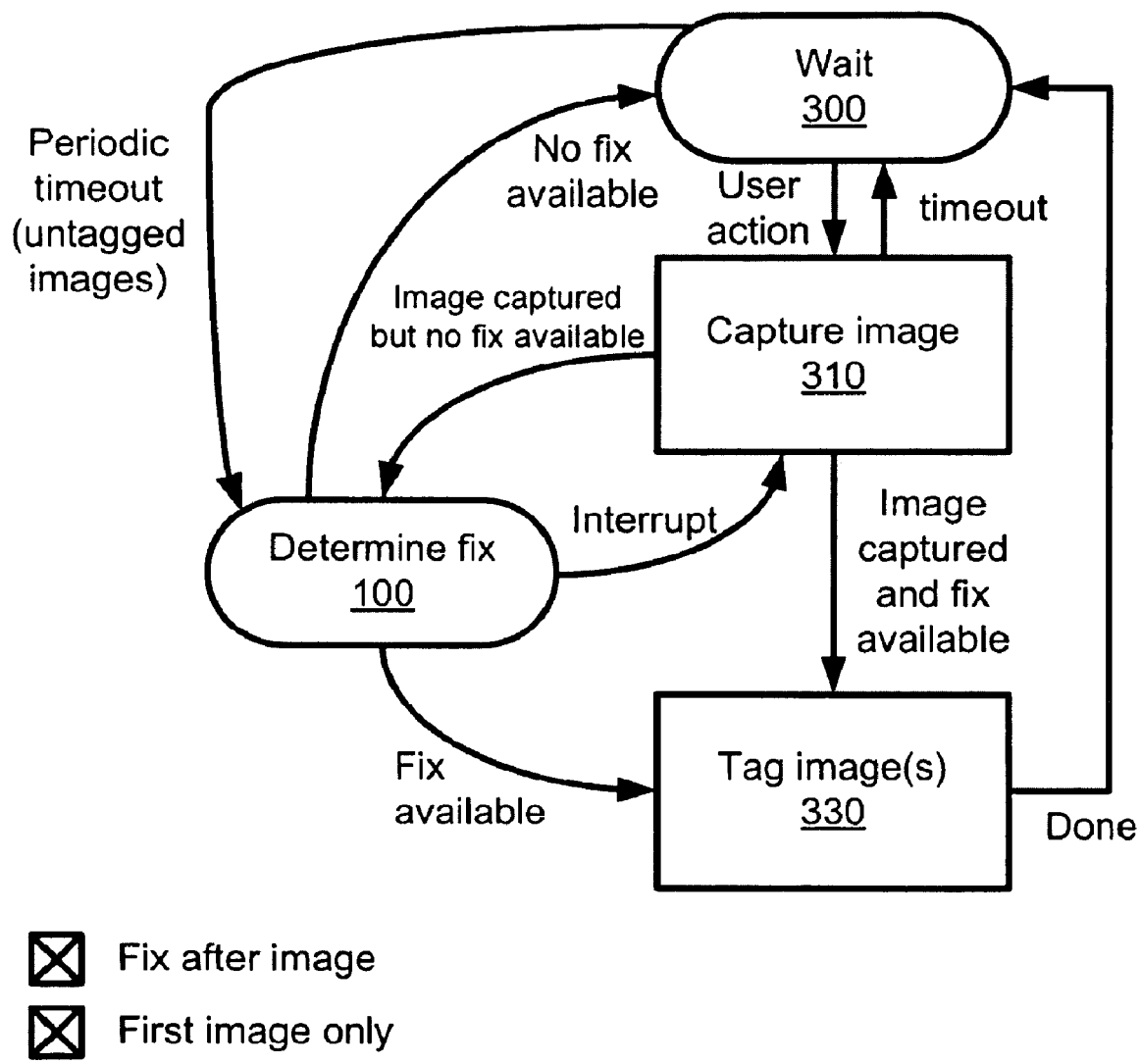

FIGS. 8A, 8B and 8C show an example where the mobile station is configured to acquire a location fix after a first image in a sequence of images was captured and to use the same location fix for each of the sequence of images. A group of images may be determined that they are a sequence of images based on each image begin captured within a predetermined duration of time before a previous image. For example, images in the sequence are captured with 30 seconds, 1 minute, 2 minutes, 3 minutes, 4 minutes, 5 minutes or some other predetermined duration of time from an immediately preceding image. Alternately, images in the sequence are captured within a predetermined window of time. For example, images in the sequence are captured within of window of 5 minutes, 10 minutes, 15 minutes or 30 minutes from the first image. Alternatively, the sequence of images may last until the user instructs the mobile station to terminate the sequence.

FIG. 8A shows a sequence of captured images being tagged with the same location fix. At 'A', a user captures a first image in state 210. Following the capturing of the first image at 'B', a location fix is determined in state 220. At 'C', the determined location fix is used to tag the first image in state 230. The mobile station returns to an idle state 200. At 'D', the mobile station captures a second image in state 210. Instead of determining a new location fix in state 220, the previously determined location fix is used to tag the second image in state 230 at 'E'. Subsequent images in the sequence are similarly captured in state 210 and tagged in state 230. The determined location fix may be replaced in the future by a refreshed position location fix, which may be used for subsequent sequences of images.

FIG. 8B shows a sequence of events where a position determining process is interrupted by a user capturing images. At 'A', the mobile station enters state 210 to capture a first image. At 'B', the mobile station enters state 220 to begin location fix determination. The user interrupts this process by beginning to capture a second image (at 'C' in state 210). Once image capturing is complete, the mobile station reenters state 220 to continue the location fix determination process (at 'D'). Once the mobile station determines and saves a new location fix to memory, the mobile station tags the two untagged images previously captured (at 'E' in state 230). The mobile station then returns to the idle state 200. The sequence of images continues with the user capturing a third image (at 'F' in state 210). The third image is also tagged with the same location fix (at 'C' in state 230). The same location fix is used until the sequence of images terminates. Eventually, the saved location fix may be replaced with a refreshed updated location fix.

FIG. 8C shows a flow diagram summarizing events and actions for a mobile station configured to acquire a location fix after a first image in a sequence of images was captured and to use the same location fix for each of the sequence of images. The flow begins with the mobile station in the wait state 300. A user action causes the mobile station to enter a capture image state 310. If an image is captured and no fix is available, the mobile station enters state 100 to determine a location fix. If an image is captured and a location fix is available (e.g., resulting from a previous picture in the sequence of pictures), the mobile station enters state 330 to tag the image. If no image is captured, the mobile station may timeout and return to the wait state 300. Once the image is tagged, the mobile station returns to the wait state 300. While in the process of determining a location fix in state 100, the mobile station may determine the location fix and enter state 330 to tag one or more images, may be interrupted by the user capturing another image and enter state 310, or may not be able to obtain a location fix and return to the wait state 300. While waiting in state 300, the mobile station may periodically timeout and attempt to obtain a location fix for an untagged images. The mobile station may timeout periodically over a predetermine duration of time until finally abandoning its attempt at automatically tagging the untagged images.

Figure 9A:
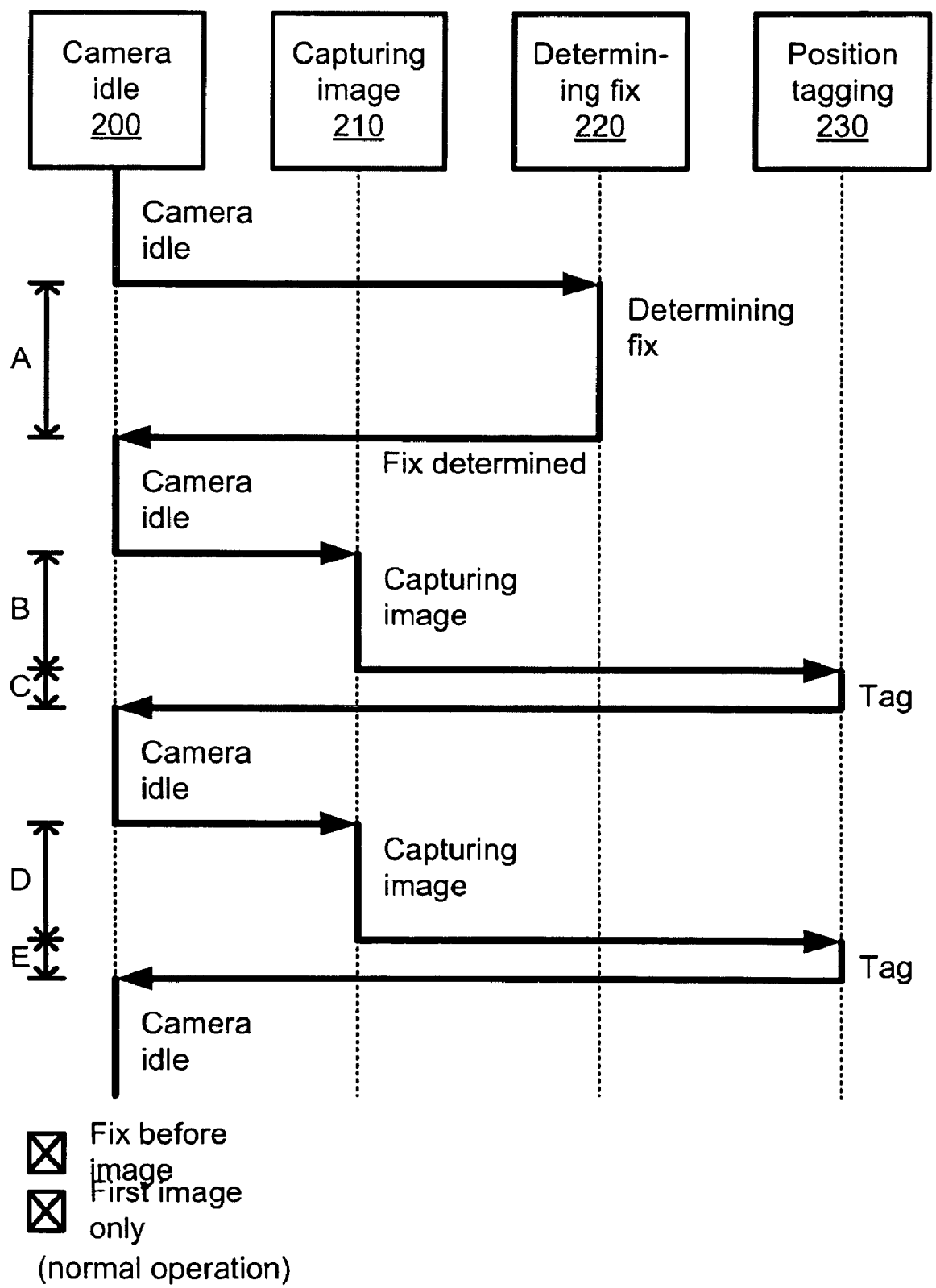
Figure 9B:
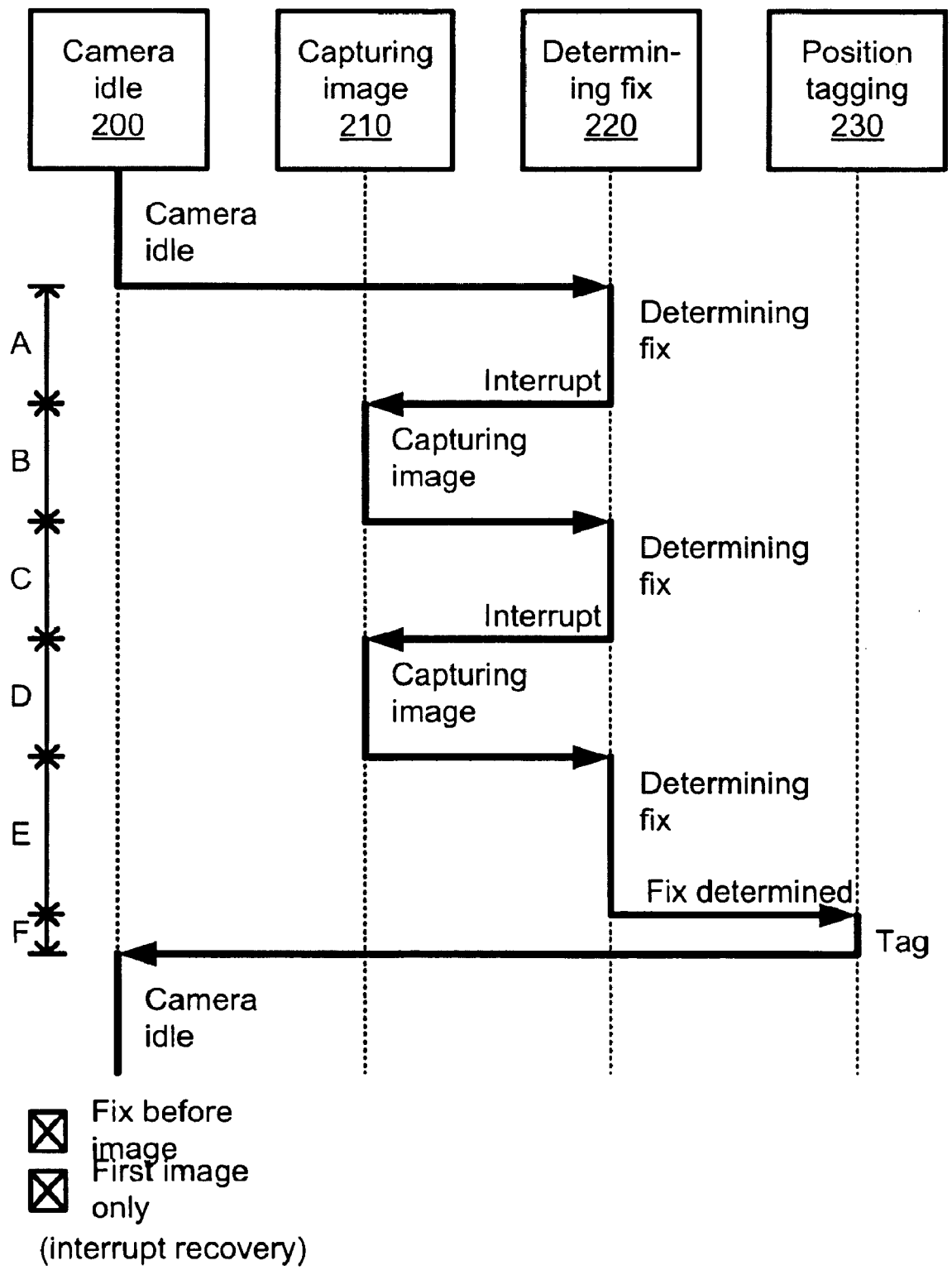
Figure 9C:
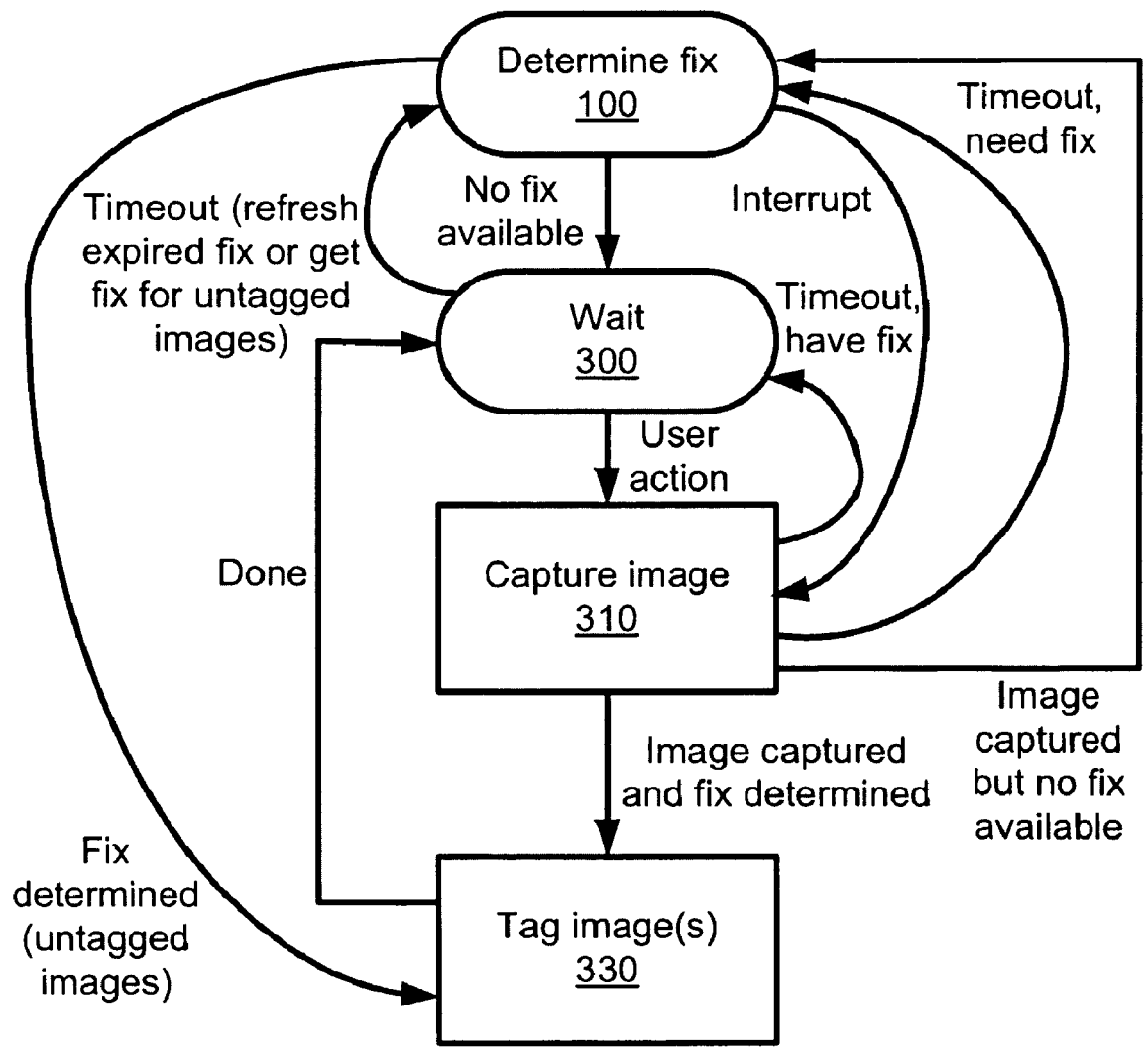

FIGS. 9A, 9B and 9C show an example where the mobile station is configured to use a location fix acquired before a first image in a sequence of images is captured and to use the same location fix for each of the sequence of images.

FIG. 9A shows a process of capturing a sequence of images and tagging these images with the same pre-determined location fix. At 'A', processing starts with determining a location fix in state 220 before the first image is captured. Once a location fix is determined, the mobile station enters the wait state 200. At 'B', the user captures a first image in state 210, which the mobile station tags in state 230 at 'C' and returns to the wait state 200. This process may repeat for each image in the sequence. For example at 'D', the user captures a second image in state 210, which the mobile station tags in state 230 at 'E' and returns to the wait state 200.

FIG. 9B shows a mobile station interrupting the determination process to capture images before a location fix is determined. At 'A', the mobile station begins determining a location fix at state 220. The mobile station interrupts state 220 to capture a first image in state 210 (at 'B'), then returns to determining the location fix in state 220 (at 'C'). Again, the mobile station interrupts the location fix determination process to capture a second image in state 220 (at 'D'). In this example, after the second image is captured, the mobile station completes its process of determining a location fix in state 220 (at 'E'). At state 230, the mobile station tags the two untagged images (at 'F') then returns to the idle state 200.

FIG. 9C shows a flow diagram summarizing events and actions for a mobile station configured to use a location fix acquired before a first image in a sequence of images is captured and to use the same location fix for each of the sequence of images. Processing begins in state 100 to determine a location fix. Once a location fix is determined in state 100, the mobile station saves the determined location fix to memory and either enters state 300 to wait or enters state 330 to tag untagged images. Alternatively, if no fix is available, the mobile station sets a timer to attempt the determination at a predetermined duration of time in the future then enters a wait state 200. During the determination, process a user action may cause the mobile station to interrupt the determination process and enter state 310 to capture an image. The mobile station may exit state 310 if an image is captured and a location fix has already been determined (thereby entering state 330), if an image is captured but no fix is available yet (thereby entering state 100), if the mobile station times out waiting to capture an image but no image is captured and a location fix is already saved (thereby entering state 300), and if the mobile station times out waiting to capture an image but no image is captured and no fix is saved (thereby entering state 100). Once untagged images are tagged in state 330, the mobile station returns to the wait state 300. While waiting in state 300, the mobile station may timeout and reenter state 100. For example, the mobile station may timeout to refresh a previously saved location fix. The mobile station may also timeout if one or more captured images are untagged and a predetermine duration of time has not yet passed allowing the mobile station to make another attempt at position location.

Some configurations described above provide for a mobile station to tag one more images with a position determined before the image was captured. Some configurations described above provide for a mobile station to tag one or more images with a position determined after an image is captured. A mobile station may also select between two different positions to tag an image. For example, a mobile station may tag an image with the last available location fix. A duration of time from the last location fix to the time the image was captured may be recorded (TIME_PREVIOUS_FIX). The mobile station later may determine an updated location fix. The duration of time from the captured image to the updated location fix may also be recorded (TIME_FIX_NEXT). If this next duration (TIME_FIX_NEXT) is less than the previous duration (TIME_PREVIOUS_FIX), the mobile station may replace the previous tag with this updated location fix. In an alternative embodiment, the time of image capture can be used to interpolate a location between two successive location fixes where the time of image capture falls between the two times of location fixes.

In some embodiments, a first image is tagged with a previously determined location, a location fix determined after the image was captured, or the better of the two location fixes as just described. In some embodiments, the mobile station determines whether to enter into a mode where the first image only is tagged with a unique location fix. For example, in a sports mode, where multiple images are taken within a short amount of time from one another, the mobile station may apply the same location fix to all of the images taken.

Figure 10A:
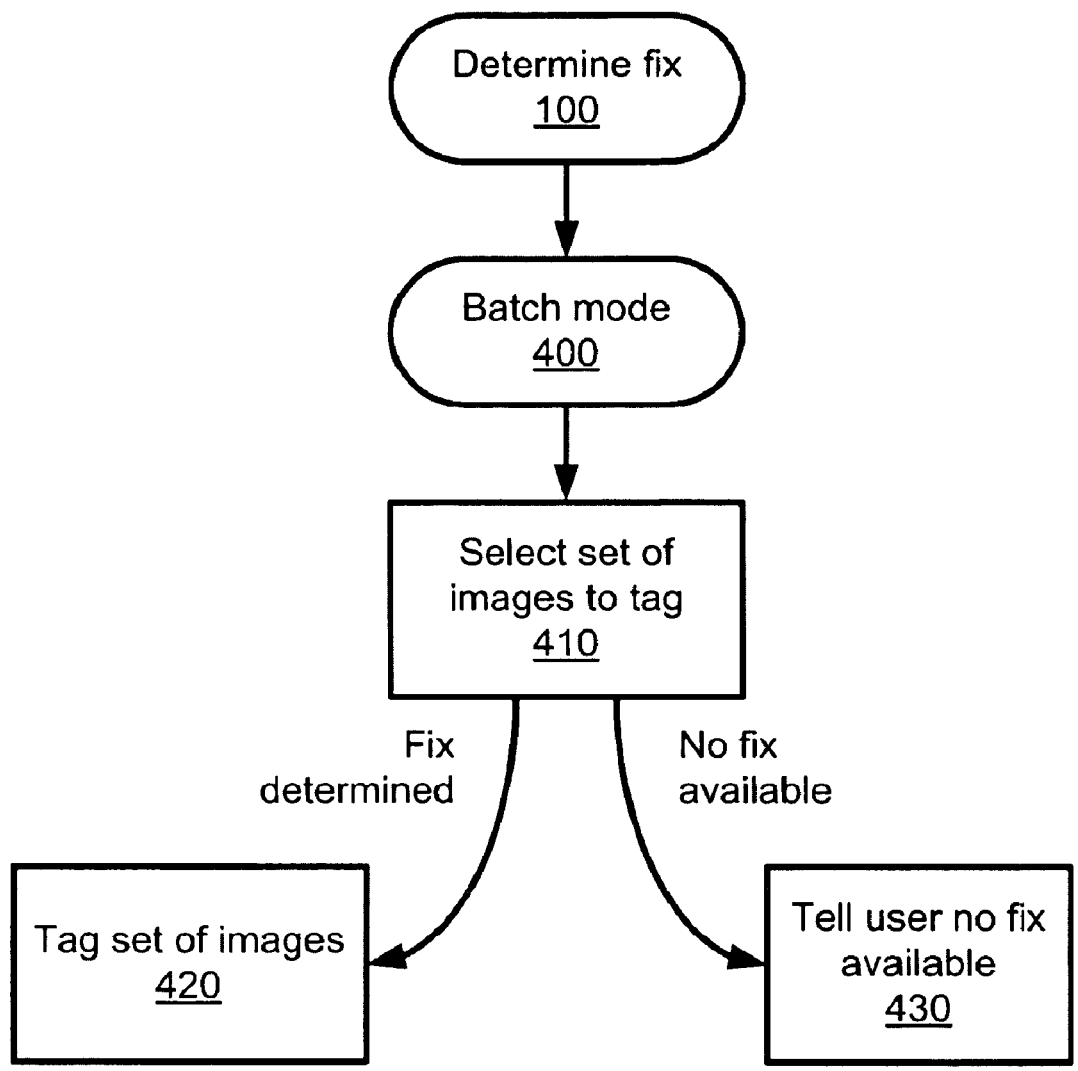
FIGS. 10A and 10B show process flows for tagging images, in accordance with some embodiments of the present invention.
Figure 10B:
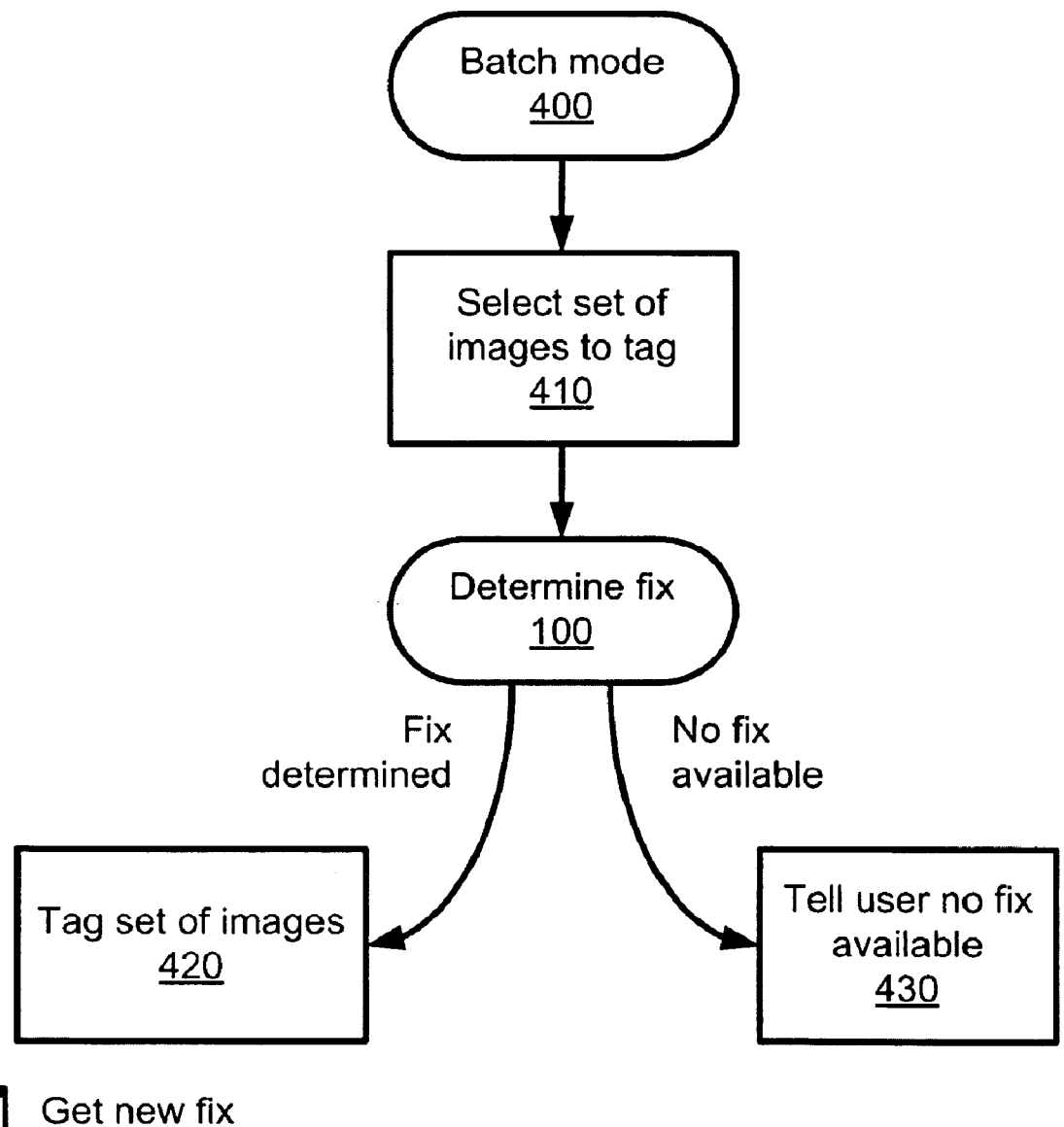

FIGS. 10A and 10B show process flows for tagging images, in accordance with some embodiments of the present invention. FIG. 10A shows a batch mode of tagging images where the mobile station is configured to use the last location fix. At 100, the mobile station determines a location fix. At some future time, the user enters a batch mode 400. In the batch mode, the user may select a "Use last location fix" option as shown in FIG. 5B. The mobile station presents a list of images for tagging (e.g., the last set of untagged images, all untagged images, or the like). At 410, the user selects a set of images to be tagged with the last determined location fix. At 420, if a location fix was previously determined and saved to memory, the mobile station tags each image with the last determined location fixed saved in memory. At 430, if no fix is available in memory, the mobile station instructs the user that no fix is available. Alternatively, the option for tagging a set of images with the "Use last fix" option when no such location fix exists in memory, may modify the display to the user to gray out this option thereby making it un-selectable.

Alternatively, the user could be queried to provide a fix or geographical indicator. For example, if no fix is available, the user could be prompted to describe the location where the images where captured (e.g., the user could enter "Wat Ayuthayya" and the device could tag the set of images with this text), which would allow for post processing and reverse geocoding at a later time. At some point in the future, this text from the each image could be ported to a server that matches and converts the user entered text to an equivalent GPS determined fix. The images could then tagged with a fix in addition or instead of the user entered text.

FIG. 10B shows a batch mode of tagging images where the mobile station is configured to get a new location fix. At 400, the user enters a batch mode 400. In the batch mode, the user may select a "Get new fix" option as shown in FIG. 5B. At 410, the user selects a set of images to be tagged with the next determined location fix. At 100, the mobile station determines a location fix. At 420, if a location fix was determined, the mobile tags each image with this determined location fix. At 430, if no fix could be determined, the mobile station instructs the user that no fix is available.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration.

What is claimed is:

1. A method of geographically tagging images in a mobile device comprising a camera, the method comprising:
    capturing one or more images;
    receiving at least one of one or more user-configurable parameters;
    using the one or more user configurable parameters to determine when a position will be determined relative to said capturing one or more images, comprising:
        determining the position after said capturing one or more images in response to a first value of the one or more user-configurable parameters;
        determining the position before said capturing one or more images in response to a second value of the one or more user-configurable parameters; and
        determining the position concurrently with said capturing one or more images in response to a third value of the one or more user configurable parameters;
    attempting to detect satellite signals and/or wireless network signals;
    comparing said satellite signals and/or wireless network signals with a threshold;
    choosing a mode of position determination based on said comparison of said satellite signals and/or wireless network signals;
    determining the position utilizing said mode of position determination;
    tagging the one or more images with the determined position.

2. The method of claim 1, further comprising configuring, by a user, at least one of the one or more user-configurable parameters.

3. The method of claim 1, wherein:
    a fourth value of the one or more user-configurable parameters indicates the act of determining the position occurs once each image; and
    a fifth value of the one or more user-configurable parameters indicates the act of determining the position occurs once for a set of images.

4. The method of claim 1, wherein said determining the position depends on a sequence of positions.

5. The method of claim 1, wherein said determining the position consists of an interpolation of a sequence of positions.

6. The method of claim 1, wherein said determining the position comprises determining the position based on a selected one of:
    a stand-alone SPS mode;
    an assisted-SPS mode; and
    a network-information mode.

7. The method of claim 6, wherein:
    the stand-alone SPS mode is selected based on SPS signals meeting a first threshold;
    the assisted-SPS mode is selected based on the SPS signals meeting a second threshold lower than the first threshold, and further based on the availability of network information; and
    the network-information mode is selected based on the SPS signal not meeting the second threshold, and further based on the availability of the network information.

8. The method of claim 7, wherein the first threshold indicates a quality of the SPS signals.

9. The method of claim 7, wherein the first threshold indicates a quantity of the SPS signals.

10. The method of claim 7, wherein the network information comprises an identification of a cell.

11. The method of claim 7, wherein the network information comprises an identification of an access point.

12. The method of claim 1, wherein said capturing one or more images comprises:
    interrupting a previous determination of a position;
    capturing one or more images to memory; and
    initiating said determining the position.

13. The method of claim 1, further comprising:
    failing to determine the position;
    determining no location fix is available;
    entering an idle state; and
    timing out of the idle state based on an existence of an unstamped image.

14. The method of claim 1, further comprising timing out of an idle state to refresh a location fix.

15. The method of claim 1, further comprising timing out of an idle state to refresh an unused location fix.

16. The method of claim 1, wherein said determining the position comprises weighting a plurality of locations each associated with a terrestrial base station.

17. The method of claim 1, wherein the mobile device further comprises a cellular telephone.

18. The method of claim 1, wherein the mobile device further comprises a personal navigation device.

19. The method of claim 1, wherein the one or more images comprises one or more video images.

20. The method of claim 1, wherein the one or more images comprise one or more audio tracts.

21. The method of claim 1, wherein the one or more images comprise one or more still images.

22. The method of claim 1, wherein said tagging the image with the determined position comprises:
    tagging the image with a first position determined before the image was captured; and
    re-tagging the image with a second position determined after the image was captured.

23. The method of claim 1, wherein said tagging the image with the determined position comprises tagging the image with a sequence of determined positions.

24. A mobile device comprising a camera for geographically tagging images, the device comprising:
means for capturing one or more images;
means for receiving at least one of one or more user-configurable parameters;
means for using the one or more user-configurable parameters to determine when a position will be determined in relation to the one or more images, comprising:
means for determining the position after said capturing the one or more images in response to a first value of the one or more user-configurable parameters;
means for determining the position before said capturing the one or more images in response to a second value of the one or more user-configurable parameters;
means for determining the position concurrently with said capturing one or more images in response to a third value of the one or more user-configurable parameters;
means for attempting to detect satellite signals and/or wireless network signals;
means for comparing said satellite signals and/or wireless network signals with a threshold;
means for choosing a mode of position determination based on said comparison of said satellite signals and/or wireless network signals;
means for determining the position utilizing said mode of position determination;
means for tagging the one or more images with the determined position.

25. The mobile device of claim 24, further comprising:
means for determining no location fix is available;
means for entering an idle state; and
means for timing out of the idle state based on an existence of an unstamped image.

26. A non-transitory computer-readable medium comprising executable codes when executed by at least one computer to:
capture one or more images;
receive at least one of one or more user-configurable parameters;
use the one or more user-configurable parameters to determine when a position will be determined in relative to said capturing one or more images, comprising:
determine the position after said capturing one or more images in response to a first value of the one or more user-configurable parameters;
determine the position before said capturing one or more images in response to a second value of the one or more user-configurable parameters; and,
determine the position concurrently with said capturing one or more images in response to a third value of the one or more user-configurable parameters;
attempt to detect satellite signals and/or wireless network signals;
compare said satellite signals and/or wireless network signals with a threshold;
choose a mode of position determination based on said comparison of said satellite signals and/or wireless network signals;
determine the position utilizing said mode of position determination;
tag the one or more images with the determined position.

27. The non-transitory computer-readable medium of claim 26, further comprising: executable codes when executed by at least one computer to:
determine no fix is available;
enter an idle state; and
time out of the idle state based on an existence of an unstamped image.

* * * * *